United States Patent
Zhang

(10) Patent No.: US 10,993,130 B2
(45) Date of Patent: Apr. 27, 2021

(54) MEASUREMENT METHOD AND APPARATUS

(71) Applicant: HUAWEI TECHNOLOGIES CO., LTD., Shenzhen (CN)

(72) Inventor: Lili Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 188 days.

(21) Appl. No.: 15/756,595

(22) PCT Filed: Sep. 1, 2015

(86) PCT No.: PCT/CN2015/088796
§ 371 (c)(1),
(2) Date: Mar. 1, 2018

(87) PCT Pub. No.: WO2017/035797
PCT Pub. Date: Mar. 9, 2017

(65) Prior Publication Data
US 2018/0184316 A1    Jun. 28, 2018

(51) Int. Cl.
*H04W 24/08* (2009.01)
*H04W 24/10* (2009.01)
(Continued)

(52) U.S. Cl.
CPC ........... *H04W 24/10* (2013.01); *H04W 24/08* (2013.01); *H04W 28/16* (2013.01); *H04W 72/0493* (2013.01); *H04W 16/32* (2013.01)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS

2011/0275394 A1    11/2011   Song et al.
2012/0113812 A1    5/2012    Ji et al.
(Continued)

FOREIGN PATENT DOCUMENTS

CN    102014417 A    4/2011
CN    102075983 A    5/2011
(Continued)

OTHER PUBLICATIONS

XP050670585 R3-122733 Ericsson, Fujitsu,"Neighbour Cell List configuration support for HetNet Measurements",3GPP TSG-RAN WG3#78,New Orleans, USA, Nov. 12-16, 2012,total 4 pages.
(Continued)

*Primary Examiner* — Hassan A Phillips
*Assistant Examiner* — Prenell P Jones
(74) *Attorney, Agent, or Firm* — Kilpatrick Townsend & Stockton LLP

(57) ABSTRACT

The present invention provides a measurement method and an apparatus. The method includes: receiving, by served user equipment UE accessing a serving base station, restrictive measurement resources of at least two neighboring cells that are respectively sent by base stations serving the at least two neighboring cells; and performing, by the served UE based on the restrictive measurement resources, RRM measurement on a neighboring cell, in the at least two neighboring cells, whose measurement resource needs to be limited, and/or performing radio link monitoring RLM on a serving cell of the UE based on the restrictive measurement resources. According to the method, the served UE can learn the restrictive measurement resource of the neighboring cell, and according to the restrictive measurement resource learnt by the served UE, the served UE performs neighboring-cell RRM measurement and/or performs RLM on the serving cell of the served UE.

15 Claims, 5 Drawing Sheets

```
┌─────────────────────────────────────────────────┐
│  Served UE accessing a serving base station     │  ← 101
│  receives restrictive measurement resources     │
│  of at least two neighboring cells that are     │
│  respectively sent by base stations serving     │
│  the at least two neighboring cells             │
└─────────────────────────────────────────────────┘
                        │
                        ▼
┌─────────────────────────────────────────────────┐
│  The served UE performs, based on the           │  ← 102
│  restrictive measurement resources,             │
│  neighboring-cell RRM measurement on a          │
│  neighboring cell, in the at least two          │
│  neighboring cells, whose measurement           │
│  resource needs to be limited, and/or performs  │
│  RLM on a serving cell of the served UE based   │
│  on the restrictive measurement resources       │
└─────────────────────────────────────────────────┘
```

(51) Int. Cl.
*H04W 28/16* (2009.01)
*H04W 72/04* (2009.01)
*H04W 16/32* (2009.01)

(56) References Cited

U.S. PATENT DOCUMENTS

| | | | |
|---|---|---|---|
| 2012/0157082 | A1 | 6/2012 | Pedersen et al. |
| 2013/0084910 | A1 | 4/2013 | Suzuki et al. |
| 2013/0201848 | A1* | 8/2013 | Kazmi .................. H04W 24/00 370/252 |
| 2013/0329612 | A1* | 12/2013 | Seo ...................... H04J 11/0056 370/280 |
| 2014/0056243 | A1* | 2/2014 | Pelletier ................ H04W 74/04 370/329 |
| 2014/0092761 | A1* | 4/2014 | Behravan .............. H04W 24/02 370/252 |
| 2014/0219131 | A1 | 8/2014 | Yang et al. |
| 2014/0293953 | A1 | 10/2014 | Seo |
| 2014/0348015 | A1 | 11/2014 | Seo et al. |
| 2015/0131553 | A1* | 5/2015 | Centonza .............. H04W 24/10 370/329 |
| 2015/0173089 | A1* | 6/2015 | Baghel .................. H04W 4/90 370/329 |
| 2015/0249952 | A1* | 9/2015 | Lee ........................ H04W 4/06 370/312 |
| 2016/0006529 | A1* | 1/2016 | Yi ....................... H04J 11/0056 370/329 |
| 2016/0081093 | A1* | 3/2016 | Hugl ..................... H04J 11/005 370/329 |
| 2016/0338138 | A1* | 11/2016 | Pelletier ................ H04W 74/04 |
| 2018/0019828 | A1* | 1/2018 | Yoo ....................... H04B 15/00 |
| 2018/0115357 | A1* | 4/2018 | Park ....................... H04B 7/04 |
| 2018/0176810 | A1* | 6/2018 | Thangarasa ........... H04W 76/11 |

FOREIGN PATENT DOCUMENTS

| | | |
|---|---|---|
| CN | 102469490 A | 5/2012 |
| CN | 102487527 A | 6/2012 |
| CN | 102984722 A | 3/2013 |
| CN | 103052087 A | 4/2013 |
| CN | 103843262 A | 6/2014 |
| CN | 104025484 A | 9/2014 |

OTHER PUBLICATIONS

XP050987580 3GPP TS 36.300 V13.0.0 (Jun. 2015),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),dated Jun. 2015,total 254 pages.

3GPP TS 36.331 V12.6.0 (Jun. 2015),3rd Generation Partnership Project;Technical Specification Group Radio Access Network;Evolved Universal Terrestrial Radio Access (E-UTRA);Radio Resource Control (RRC);Protocol specification (Release 12),dated Jun. 2015,total 449 pages.

* cited by examiner

MEASUREMENT METHOD AND APPARATUS

CROSS-REFERENCE TO RELATED APPLICATIONS

This application is a national stage of International Application No. PCT/CN2015/088796, filed on Sep. 1, 2015, which is hereby incorporated by reference in its entirety.

TECHNICAL FIELD

The present invention relates to the field of communications technologies, and in particular, to a measurement method and an apparatus.

BACKGROUND

In a heterogeneous network (English: Heterogeneous Network, HetNet for short), a time-domain enhanced inter-cell interference coordination (English: enhanced Inter-cell Interference Coordination, eICIC for short) mechanism effectively increases system and cell-edge throughputs. With eICIC, an almost blank subframe (English: Almost Blank Subframe, ABS for short) is used in a macro cell to reduce interference of the macro cell on user equipment (English: User Equipment, UE for short) within a cell range extension (English: Cell Range Expansion, CRE for short) area, that is, a small cell. Interfered-with user equipment can be prevented from interference only when the user equipment decodes control information or transmits data in the ABS.

At present, when macro UE accessing the macro cell approaches small cells, the small cells that the macro UE approaches may be referred to as neighboring cells of the macro UE. The macro UE needs to perform neighboring-cell radio resource management (English: Radio Resource Management, RRM for short) measurement. To ensure an effect of neighboring-cell RRM measurement performed by the macro UE and reduce interference of the macro cell on neighboring-cell RRM measurement, a macro base station (macro eNB) predefines a set of neighboring-cell restrictive measurement resources. The neighboring-cell restrictive measurement resources are subsets of the ABS. When the macro UE needs to perform neighboring-cell RRM measurement, the macro base station selects, from the ABS, some subframes to form neighboring-cell restrictive measurement resources, and notifies the macro UE of the neighboring-cell restrictive measurement resources. The macro UE performs neighboring-cell RRM measurement in the subframes included in the neighboring-cell restrictive measurement resources.

However, when ultra dense networking is used, there are a plurality of interference sources, and interference is not from only the macro base station. Interference caused due to superposition of interference from at least two neighboring cells becomes main interference. As small cells (such as a micro base station, a pico base station, and a femto base station) are distributed more densely, service fluctuation becomes severer. This requires that an eICIC mode should be changed more frequently.

The inventor finds that, although an existing neighboring-cell RRM measurement method can reduce interference of a macro cell on RRM measurement, when small cells are densely distributed, serious mutual interference is caused and interference between the small cells affects a measurement effect and measurement accuracy of neighboring-cell RRM measurement and/or macro-cell radio link monitoring (English: Radio Link Monitoring, RLM for short) that are/is performed by the macro UE.

SUMMARY

Embodiments of the present invention provide a measurement method and an apparatus, so as to resolve a prior-art technical problem that when small cells are densely distributed, serious mutual interference is caused and interference between the small cells affects a measurement effect and measurement accuracy of neighboring-cell RRM measurement and/or macro-cell RLM that are/is performed by macro UE.

A first aspect of the present invention provides a measurement method, including:

receiving, by served user equipment UE accessing a serving base station, restrictive measurement resources of at least two neighboring cells that are respectively sent by base stations serving the at least two neighboring cells; and performing, by the served UE based on the restrictive measurement resources, RRM measurement on a neighboring cell, in the at least two neighboring cells, whose measurement resource needs to be limited, and/or performing radio link monitoring RLM on a serving cell of the served UE based on the restrictive measurement resources.

With reference to the first aspect, in a first possible implementation of the first aspect, the receiving, by served user equipment UE accessing a serving base station, restrictive measurement resources of at least two neighboring cells that are respectively sent by base stations serving the at least two neighboring cells includes:

receiving, by the served UE by using broadcast channels of the at least two neighboring cells, the restrictive measurement resources of the at least two neighboring cells that are respectively sent by the base stations serving the at least two neighboring cells.

With reference to the first possible implementation of the first aspect, in a second possible implementation of the first aspect, the receiving, by the served UE by using broadcast channels of the at least two neighboring cells, the restrictive measurement resources of the at least two neighboring cells that are respectively sent by the base stations serving the at least two neighboring cells includes:

receiving, by the served UE by using the broadcast channels of the at least two neighboring cells, new system messages SIBs or existing system messages SIBs that are respectively sent by the base stations serving the at least two neighboring cells; and obtaining the restrictive measurement resources carried on the new system messages SIBs or on a new information element in the existing system messages SIBs.

With reference to the second possible implementation of the first aspect, in a third possible implementation of the first aspect, before the receiving, by served user equipment UE accessing a serving base station, restrictive measurement resources of at least two neighboring cells that are respectively sent by base stations serving the at least two neighboring cells, the method further includes:

receiving, by the served UE, an indication message sent by the base stations serving the at least two neighboring cells, where the indication message is used to indicate time-domain and/or frequency-domain resource location information of the new SIB messages.

With reference to the first aspect, in a fourth possible implementation of the first aspect, before the receiving, by served user equipment UE accessing a serving base station, restrictive measurement resources of at least two neighboring cells that are respectively sent by base stations serving the at least two neighboring cells, the method further includes:

sending, by the served UE, a requirement indication to each of the at least two neighboring cells, where the requirement indication is used to request the restrictive measurement resource.

With reference to the fourth possible implementation of the first aspect, in a fifth possible implementation of the first aspect, the requirement indication includes specific information corresponding to each of the at least two neighboring cells.

With reference to the fifth possible implementation of the first aspect, in a sixth possible implementation of the first aspect, the specific information is a signal, a sequence, or a code.

With reference to the sixth possible implementation of the first aspect, in a seventh possible implementation of the first aspect, the signal is a sounding reference signal SRS or a demodulation reference signal DMRS.

With reference to the sixth possible implementation of the first aspect, in an eighth possible implementation of the first aspect, the sequence is a beacon or a synchronization sequence.

With reference to the sixth possible implementation of the first aspect, in a ninth possible implementation of the first aspect, the code is a Code Division Multiple Access CDMA code or a preamble.

With reference to the any one of the fifth possible implementation of the first aspect to the ninth possible implementation of the first aspect, in a tenth possible implementation of the first aspect, before the sending, by the served UE, a requirement indication to each of the at least two neighboring cells, the method further includes:

receiving, by the served UE, the specific information sent by the serving base station.

With reference to the tenth possible implementation of the first aspect, in an eleventh possible implementation of the first aspect, the receiving, by the served UE, the specific information sent by the serving base station includes:

receiving, by the served UE, the specific information by using broadcast signaling or dedicated Radio Resource Control RRC signaling.

With reference to any one of the fifth possible implementation of the first aspect to the eleventh possible implementation of the first aspect, in a twelfth possible implementation of the first aspect, the requirement indication further includes purpose indication information, which is used to notify the base station serving the neighboring cell that the specific information is used to obtain the restrictive measurement resource.

With reference to any one of the fifth possible implementation of the first aspect to the eleventh possible implementation of the first aspect, in a thirteenth possible implementation of the first aspect, the receiving, by served user equipment UE accessing a serving base station, restrictive measurement resources of at least two neighboring cells that are respectively sent by base stations serving the at least two neighboring cells includes:

receiving, by the served UE on a physical downlink shared channel PDSCH, notification messages that are respectively sent by the base stations serving the at least two neighboring cells, where the notification messages carry the restrictive measurement resources; and decoding, by the served UE, the notification messages by using a predefined radio network temporary identifier RNTI, to obtain the restrictive measurement resources, where the RNTI is cross-correlated with the specific information.

With reference to any one of the first aspect, or the first possible implementation of the first aspect to the thirteenth possible implementation of the first aspect, in a fourteenth possible implementation of the first aspect, the method further includes:

obtaining, by the served UE, a reference signal received power RSRP or a reference signal received quality RSRQ of each of the at least two neighboring cells; and determining that a neighboring cell corresponding to an RSRP or an RSRQ that satisfies a first threshold is the neighboring cell whose measurement resource needs to be limited, where the first threshold indicates that the served UE approaches the neighboring cell.

With reference to the fourteenth possible implementation of the first aspect, in a fifteenth possible implementation of the first aspect, when a cell-specific reference signal CRS and/or an enhanced inter-cell interference coordination eICIC mechanism are/is used, the restrictive measurement resources are subsets of an almost blank subframe ABS; or when a cell on/off mechanism and/or a coordinated multipoint transmission/reception CoMP mechanism are/is used, the restrictive measurement resources are discovery reference signals DRSs, where the DRSs are channel state information-reference signals CSI-RSs and/or channel state information-interference measurement resources CSI-IMRs.

With reference to the fifteenth possible implementation of the first aspect, in a sixteenth possible implementation of the first aspect, when the restrictive measurement resources are subsets of the almost blank subframe ABS, the performing, by the served UE based on the restrictive measurement resources, radio link monitoring RLM on a serving cell includes:

determining, by the served UE, a neighboring cell corresponding to an RSRP or an RSRQ that does not satisfy the first threshold but satisfies a second threshold; and performing, by the served UE, radio link monitoring RLM on the serving cell on the restrictive measurement resource of the neighboring cell.

With reference to any one of the first aspect, or the first possible implementation of the first aspect to the sixteenth possible implementation of the first aspect, in a seventeenth possible implementation of the first aspect, after the receiving, by served user equipment UE accessing a serving base station, restrictive measurement resources of at least two neighboring cells that are respectively sent by base stations serving the at least two neighboring cells, the method further includes:

reporting, by the served UE, the restrictive measurement resources to the serving base station, so that the serving base station schedules the served UE for data transmission on the restrictive measurement resources.

With reference to the seventeenth possible implementation of the first aspect, in an eighteenth possible implementation of the first aspect, the reporting, by the served UE, the restrictive measurement resources to the serving base station includes:

reporting, by the served UE, the restrictive measurement resources to the serving base station by using a physical uplink shared channel PUSCH.

With reference to the seventeenth possible implementation of the first aspect, in a nineteenth possible implementation of the first aspect, the reporting, by the served UE, the restrictive measurement resources to the serving base station includes:

reporting, by the served UE, the restrictive measurement resources to the serving base station according to a preset mode, so that the serving base station is capable of correctly obtaining the restrictive measurement resources.

With reference to any one of the first aspect, or the first possible implementation of the first aspect to the nineteenth possible implementation of the first aspect, in a twentieth possible implementation of the first aspect, the serving base station is a macro base station, and the served UE is macro UE.

A second aspect of the present invention provides a restrictive measurement resource notification method, including:

obtaining, by a base station serving a neighboring cell of user equipment UE, a restrictive measurement resource used by the base station; and sending, by the base station serving the neighboring cell, the restrictive measurement resource to the UE, so that the UE is capable of performing neighboring-cell radio resource management RRM measurement based on the restrictive measurement resource and/or performing radio link monitoring RLM on a serving cell of the UE based on the restrictive measurement resource.

With reference to the second aspect, in a first possible implementation of the second aspect, the sending, by the base station serving the neighboring cell, the restrictive measurement resource to the UE includes:

broadcasting, by the base station serving the neighboring cell, the restrictive measurement resource to the UE by using a broadcast channel.

With reference to the first possible implementation of the second aspect, in a second possible implementation of the second aspect, the broadcasting, by the base station serving the neighboring cell, the restrictive measurement resource to the UE by using a broadcast channel includes:

broadcasting, by the base station serving the neighboring cell, a new system message SIB by using the broadcast channel, where the new SIB carries the restrictive measurement resource; or broadcasting, by the base station serving the neighboring cell, an existing system message SIB by using the broadcast channel, where a new information element in the current SIB carries the restrictive measurement resource.

With reference to the second possible implementation of the second aspect, in a third possible implementation of the second aspect, the new SIB or the current SIB carries the restrictive measurement resource by using an almost blank subframe ABS.

With reference to the first possible implementation of the second aspect or the second possible implementation of the second aspect, in a fourth possible implementation of the second aspect, a transmit power for broadcasting, by the base station serving the neighboring cell, the new system message SIB by using the broadcast channel is greater than a preset broadcast channel power.

With reference to the fourth possible implementation of the second aspect, in a fifth possible implementation of the second aspect, the method further includes:

adjusting, by the base station serving the neighboring cell, the transmit power by using a handover success rate.

With reference to any one of the second possible implementation of the second aspect to the fifth possible implementation of the second aspect, in a sixth possible implementation of the second aspect, the new SIB is processed in at least one of the following manners:

performing modulation by using a special modulation and coding scheme;

embedding a demodulation reference signal DMRS in the new SIB; or determining a ratio EPRE between the new SIB message and a reference signal, and indicating the ratio EPRE to the UE.

With reference to any one of the second possible implementation of the second aspect to the sixth possible implementation of the second aspect, in a seventh possible implementation of the second aspect, before the sending, by the base station serving the neighboring cell, the restrictive measurement resource to the UE, the method further includes:

sending, by the base station serving the neighboring cell, an indication message to the UE, where the indication message is used to indicate time-domain and/or frequency-domain resource location information of the new SIB message.

With reference to the second aspect, in an eighth possible implementation of the second aspect, the sending, by the base station serving the neighboring cell, the restrictive measurement resource to the UE includes:

sending, by the base station serving the neighboring cell, the restrictive measurement resource to the UE based on a requirement indication sent by the UE, where the requirement indication is used to request the restrictive measurement resource.

With reference to the eighth possible implementation of the second aspect, in a ninth possible implementation of the second aspect, the requirement indication includes specific information corresponding to the neighboring cell; and before the sending, by the base station serving the neighboring cell, the restrictive measurement resource to the UE, the method further includes:

receiving, by the base station serving the neighboring cell, the specific information sent by the serving base station; or preconfiguring, by means of operation, administration, and management OAM, the specific information for the base station serving the neighboring cell.

With reference to the ninth possible implementation of the second aspect, in a tenth possible implementation of the second aspect, the requirement indication includes the specific information corresponding to the neighboring cell and purpose indication information, and the purpose indication information is used to notify the base station serving the neighboring cell that the specific information is used to obtain the restrictive measurement resource.

With reference to any one of the eighth possible implementation of the second aspect to the tenth possible implementation of the second aspect, in an eleventh possible implementation of the second aspect, the sending, by the base station serving the neighboring cell, the restrictive measurement resource to the UE based on a requirement indication sent by the UE includes:

generating, by the base station serving the neighboring cell, a notification message based on the requirement indication sent by the UE, where the notification message carries the restrictive measurement resource, the notification message is coded by using a predefined radio network temporary identifier RNTI, and the RNTI is cross-correlated with the specific information; and sending the notification message to the UE by using a physical downlink shared channel PDSCH.

With reference to the ninth possible implementation of the second aspect, in a twelfth possible implementation of the second aspect, the specific information is a signal, a sequence, or a code.

With reference to the twelfth possible implementation of the second aspect, in a thirteenth possible implementation of the second aspect, the signal is a sounding reference signal SRS or a demodulation reference signal DMRS.

With reference to the twelfth possible implementation of the second aspect, in a fourteenth possible implementation of the second aspect, the sequence is a beacon or a synchronization sequence.

With reference to the twelfth possible implementation of the second aspect, in a fifteenth possible implementation of the second aspect, the code is a Code Division Multiple Access CDMA code or a preamble.

With reference to any one of the second aspect, or the first possible implementation of the second aspect to the fifteenth possible implementation of the second aspect, in a sixteenth possible implementation of the second aspect, the UE is macro UE accessing a macro base station.

A third aspect of the present invention provides a restrictive measurement resource obtaining method, including:

obtaining, by a serving base station of user equipment UE, specific information.

sending, by the serving base station, the specific information to the UE, so that the UE is capable of requesting, from each neighboring cell of the UE based on the specific information, a restrictive measurement resource of each neighboring cell, where the restrictive measurement resource is used by the UE to perform neighboring-cell RRM measurement and/or used by the UE to perform radio link measurement RLM on a serving cell of the UE.

With reference to the third aspect, in a first possible implementation of the third aspect, the specific information is a cell identity ID of each neighboring cell.

With reference to the third aspect, in a second possible implementation of the third aspect, the specific information is a signal, a sequence, or a code.

With reference to the second possible implementation of the third aspect, in a third possible implementation of the third aspect, the signal is a sounding reference signal SRS or a demodulation reference signal.

With reference to the second possible implementation of the third aspect, in a fourth possible implementation of the third aspect, the sequence is a beacon or a synchronization sequence.

With reference to the second possible implementation of the third aspect, in a fifth possible implementation of the third aspect, the code is a Code Division Multiple Access CDMA code or a preamble.

With reference to any one of the third aspect, or the first possible implementation of the third aspect to the fifth possible implementation of the third aspect, in a sixth possible implementation of the third aspect, the sending, by the serving base station, the specific information to the UE includes:

sending, by the serving base station, the specific information to the UE on a common resource, where the neighboring cells are corresponding to different specific information; or sending, by the serving base station, the specific information to the UE on different time-domain resources.

With reference to the sixth possible implementation of the third aspect, in a seventh possible implementation of the third aspect, before the sending, by the serving base station, the specific information to the UE on a common resource, the method further includes:

sending, by the serving base station, related information of the common resource to the UE.

With reference to the seventh possible implementation of the third aspect, in an eighth possible implementation of the third aspect, the sending, by the serving base station, related information of the common resource to the UE includes:

sending, by the serving base station, the related information to the UE by using broadcast signaling or dedicated Radio Resource Control RRC signaling.

With reference to the sixth possible implementation of the third aspect, in a ninth possible implementation of the third aspect, there is a matching table including the specific information and the corresponding neighboring cells, and the sending, by the serving base station, the specific information to the UE on a common resource includes:

sending, by the serving base station, the matching table to the UE on the common resource by using broadcast signaling or dedicated Radio Resource Control RRC signaling.

With reference to any one of the third aspect, or the first possible implementation of the third aspect to the ninth possible implementation of the third aspect, in a tenth possible implementation of the third aspect, before the sending, by the serving base station, the specific information to the UE, the method further includes:

obtaining, by the serving base station, a reference signal received power RSRP or a reference signal received quality RSRQ of each neighboring cell; and determining, by the serving base station, whether the RSRP or the RSRQ satisfies a threshold.

With reference to the tenth possible implementation of the third aspect, in an eleventh possible implementation of the third aspect, the sending, by the serving base station, the specific information to the UE includes:

estimating, by the serving base station, a path loss according to the RSRP or the RSRQ, to obtain an estimated path loss value;

determining, by the serving base station, a transmit power according to the estimated path loss value; and sending, by the serving base station, the specific information to the UE at the transmit power.

With reference to any one of the third aspect, or the first possible implementation of the third aspect to the fifth possible implementation of the third aspect, in a twelfth possible implementation of the third aspect, the sending, by the serving base station, the specific information to the UE includes:

sending, by the serving base station, the specific information to the UE by using a transmit power control TPC command.

With reference to any one of the third aspect, or the first possible implementation of the third aspect to the twelfth possible implementation of the third aspect, in a thirteenth possible implementation of the third aspect, the serving base station is a macro base station, and the UE is macro UE.

With reference to any one of the second possible implementation of the third aspect to the fifth possible implementation of the third aspect, in a fourteenth possible implementation of the third aspect, the method further includes:

sending, by the serving base station, the specific information to each neighboring cell, to notify each neighboring cell that the UE is to obtain, based on the specific information, the restrictive measurement resource of each neighboring cell.

A fourth aspect of the present invention provides user equipment UE, including:

a receiver, configured to receive restrictive measurement resources of at least two neighboring cells that are respectively sent by base stations serving the at least two neighboring cells of the UE accessing a serving base station; and a processor, configured to: perform, based on the restrictive measurement resources, RRM measurement on a neighboring cell, in the at least two neighboring cells, whose measurement resource needs to be limited, and/or perform radio link monitoring RLM on a serving cell of the UE based on the restrictive measurement resources.

With reference to the fourth aspect, in a first possible implementation of the fourth aspect, the receiver is configured to receive, by using broadcast channels of the at least two neighboring cells, the restrictive measurement resources of the at least two neighboring cells that are respectively sent by the base stations serving the at least two neighboring cells.

With the first possible implementation of the fourth aspect, in a second possible implementation of the fourth aspect, the receiver is configured to: receive, by using the broadcast channels of the at least two neighboring cells, new system messages SIBs or existing system messages SIBs that are respectively sent by the base stations serving the at least two neighboring cells; and obtain the restrictive measurement resources carried on the new system messages SIBs or on a new information element in the existing system messages SIBs.

With reference to the second possible implementation of the fourth aspect, in a third possible implementation of the fourth aspect, the receiver is configured to receive an indication message sent by the base stations serving the at least two neighboring cells, where the indication message is used to indicate time-domain and/or frequency-domain resource location information of the new SIB messages.

With reference to the fourth aspect, in a fourth possible implementation of the fourth aspect, the UE further includes: a transmitter, configured to send a requirement indication to each of the at least two neighboring cells, where the requirement indication is used to request the restrictive measurement resource.

With reference to the fourth possible implementation of the fourth aspect, in a fifth possible implementation of the fourth aspect, the requirement indication includes specific information corresponding to each of the at least two neighboring cells.

With reference to the fifth possible implementation of the fourth aspect, in a sixth possible implementation of the fourth aspect, the specific information is a signal, a sequence, or a code.

With reference to the sixth possible implementation of the fourth aspect, in a seventh possible implementation of the fourth aspect, the signal is a sounding reference signal SRS or a demodulation reference signal DMRS.

With reference to the sixth possible implementation of the fourth aspect, in an eighth possible implementation of the fourth aspect, the sequence is a beacon or a synchronization sequence.

With reference to the sixth possible implementation of the fourth aspect, in a ninth possible implementation of the fourth aspect, the code is a Code Division Multiple Access CDMA code or a preamble.

With reference to any one of the fifth possible implementation of the fourth aspect to the ninth possible implementation of the fourth aspect, in a tenth possible implementation of the fourth aspect, the receiver is further configured to receive the specific information sent by the serving base station.

With reference to the tenth possible implementation of the fourth aspect, in an eleventh possible implementation of the fourth aspect, the receiver is configured to receive the specific information by using broadcast signaling or dedicated Radio Resource Control RRC signaling.

With reference to any one of the fifth possible implementation of the fourth aspect to the eleventh possible implementation of the fourth aspect, in a twelfth possible implementation of the fourth aspect, the requirement indication further includes purpose indication information, which is used to notify the base station serving the neighboring cell that the specific information is used to obtain the restrictive measurement resource.

With reference to any one of the fifth possible implementation of the fourth aspect to the eleventh possible implementation of the fourth aspect, in a thirteenth possible implementation of the fourth aspect, the receiver is configured to: receive, on a physical downlink shared channel PDSCH, notification messages that are respectively sent by the base stations serving the at least two neighboring cells, where the notification messages carry the restrictive measurement resources; and decode the notification messages by using a predefined radio network temporary identifier RNTI, to obtain the restrictive measurement resources, where the RNTI is cross-correlated with the specific information.

With reference to any one of the fourth aspect, or the first possible implementation of the fourth aspect to the eleventh possible implementation of the fourth aspect, in a fourteenth possible implementation of the fourth aspect, the processor is configured to: obtain a reference signal received power RSRP or a reference signal received quality RSRQ of each of the at least two neighboring cells; and determine that a neighboring cell corresponding to an RSRP or an RSRQ that satisfies a first threshold is the neighboring cell whose measurement resource needs to be limited, where the first threshold indicates that the UE approaches the neighboring cell.

With reference to the fourteenth possible implementation of the fourth aspect, in a fifteenth possible implementation of the fourth aspect, when a cell-specific reference signal CRS and/or an enhanced inter-cell interference coordination eICIC mechanism are/is used, the restrictive measurement resources are subsets of an almost blank subframe ABS; or when a cell on/off mechanism and/or a coordinated multipoint transmission/reception CoMP mechanism are/is used, the restrictive measurement resources are discovery reference signals DRSs, where the DRSs are channel state information-reference signals CSI-RSs and/or channel state information-interference measurement resources CSI-IMRs.

With reference to the fifteenth possible implementation of the fourth aspect, in a sixteenth possible implementation of the fourth aspect, the processor is further configured to: when the restrictive measurement resources are subsets of the almost blank subframe ABS, determine a neighboring cell corresponding to an RSRP or an RSRQ that does not satisfy the first threshold but satisfies a second threshold; and perform radio link monitoring RLM on the serving cell on the restrictive measurement resource of the neighboring cell.

With reference to any one of the first possible implementation of the fourth aspect to the sixteenth possible implementation of the fourth aspect, in a seventeenth possible implementation of the fourth aspect, the UE further includes: the transmitter, configured to report the restrictive measurement resources to the serving base station, so that the serving base station schedules the UE for data transmission on the restrictive measurement resources.

With reference to the seventeenth possible implementation of the fourth aspect, in an eighteenth possible implementation of the fourth aspect, the transmitter is configured to report the restrictive measurement resources to the serving base station by using a physical uplink shared channel PUSCH.

With reference to the seventeenth possible implementation of the fourth aspect, in a nineteenth possible implementation of the fourth aspect, the transmitter is configured to report the restrictive measurement resources to the serving base station according to a preset mode, so that the serving base station is capable of correctly obtaining the restrictive measurement resources.

With reference to any one of the fourth aspect, or the first possible implementation of the fourth aspect to the nineteenth possible implementation of the fourth aspect, in a twentieth possible implementation of the fourth aspect, the serving base station is a macro base station, and the UE is macro UE.

A fifth aspect of the present invention provides a base station serving a neighboring cell, including:

a processor, configured to obtain a restrictive measurement resource used by the base station; and a transmitter, configured to send the restrictive measurement resource to user equipment UE, so that the UE is capable of performing neighboring-cell radio resource management RRM measurement based on the restrictive measurement resource and/or performing radio link monitoring RLM on a serving cell of the UE based on the restrictive measurement resource, where the base station serving the neighboring cell is a base station serving a neighboring cell of the UE.

With reference to the fifth aspect, in a first possible implementation of the fifth aspect, the transmitter is configured to broadcast the restrictive measurement resource to the UE by using a broadcast channel.

With reference to the first possible implementation of the fifth aspect, in a second possible implementation of the fifth aspect, the transmitter is configured to broadcast a new system message SIB by using the broadcast channel, where the new SIB carries the restrictive measurement resource; or broadcast an existing system message SIB by using the broadcast channel, where a new information element in the current SIB carries the restrictive measurement resource.

With reference to the second possible implementation of the fifth aspect, in a third possible implementation of the fifth aspect, the new SIB or the current SIB carries the restrictive measurement resource by using an almost blank subframe ABS.

With reference to the first possible implementation of the fifth aspect or the second possible implementation of the fifth aspect, in a fourth possible implementation of the fifth aspect, a transmit power for broadcasting, by the transmitter, the new system message SIB by using the broadcast channel is greater than a preset broadcast channel power.

With reference to the fourth possible implementation of the fifth aspect, in a fifth possible implementation of the fifth aspect, the processor is further configured to adjust the transmit power by using a handover success rate.

With reference to any one of the second possible implementation of the fifth aspect to the fifth possible implementation of the fifth aspect, in a sixth possible implementation of the fifth aspect, the new SIB is processed in at least one of the following manners:

performing modulation by using a special modulation and coding scheme;

embedding a demodulation reference signal DMRS in the new SIB; or determining a ratio EPRE between the new SIB message and a reference signal, and indicating the ratio EPRE to the UE.

With reference to any one of the second possible implementation of the fifth aspect to the sixth possible implementation of the fifth aspect, in a seventh possible implementation of the fifth aspect, the transmitter is further configured to send an indication message to the UE, where the indication message is used to indicate time-domain and/or frequency-domain resource location information of the new SIB message.

With reference to the fifth aspect, in an eighth possible implementation of the fifth aspect, the transmitter is configured to send the restrictive measurement resource to the UE based on a requirement indication sent by the UE, where the requirement indication is used to request the restrictive measurement resource.

With reference to the eighth possible implementation of the fifth aspect, in a ninth possible implementation of the fifth aspect, the requirement indication includes specific information corresponding to the neighboring cell, and the specific information is preconfigured, by means of operation, administration, and management OAM, for the base station serving the neighboring cell; or the base station serving the neighboring cell further includes: a receiver, configured to receive the specific information sent by a serving base station of the UE.

With reference to the ninth possible implementation of the fifth aspect, in a tenth possible implementation of the fifth aspect, the requirement indication includes the specific information corresponding to the neighboring cell and purpose indication information, and the purpose indication information is used to notify the base station serving the neighboring cell that the specific information is used to obtain the restrictive measurement resource.

With reference to any one of the eighth possible implementation of the fifth aspect to the tenth possible implementation of the fifth aspect, in an eleventh possible implementation of the fifth aspect, the processor is further configured to generate a notification message based on the requirement indication sent by the UE, where the notification message carries the restrictive measurement resource, the notification message is coded by using a predefined radio network temporary identifier RNTI, and the RNTI is cross-correlated with the specific information; and the transmitter is configured to send the notification message to the UE by using a physical downlink shared channel PDSCH.

With reference to the ninth possible implementation of the fifth aspect, in a twelfth possible implementation of the fifth aspect, the specific information is a signal, a sequence, or a code.

With reference to the twelfth possible implementation of the fifth aspect, in a thirteenth possible implementation of the fifth aspect, the signal is a sounding reference signal SRS or a demodulation reference signal DMRS.

With reference to the twelfth possible implementation of the fifth aspect, in a fourteenth possible implementation of the fifth aspect, the sequence is a beacon or a synchronization sequence.

With reference to the twelfth possible implementation of the fifth aspect, in a fifteenth possible implementation of the fifth aspect, the code is a Code Division Multiple Access CDMA code or a preamble.

With reference to any one of the fifth aspect, or the first possible implementation of the fifth aspect to the fifteenth possible implementation of the fifth aspect, in a sixteenth possible implementation of the fifth aspect, the UE is macro UE accessing a macro base station.

A sixth aspect of the present invention provides a serving base station, including:
  a processor, configured to obtain specific information; and
  a transmitter, configured to send the specific information to served user equipment UE accessing the serving base station, so that the UE is capable of requesting, from each neighboring cell of the UE based on the specific information, a restrictive measurement resource of each neighboring cell, where the restrictive measurement resource is used by the served UE to perform neighboring-cell RRM measurement and/or used by the served UE to perform radio link measurement RLM on a serving cell of the served UE.

With reference to the sixth aspect, in a first possible implementation of the sixth aspect, the specific information is a cell identity ID of each neighboring cell.

With reference to the sixth aspect, in a second possible implementation of the sixth aspect, the specific information is a signal, a sequence, or a code.

With reference to the second possible implementation of the sixth aspect, in a third possible implementation of the sixth aspect, the signal is a sounding reference signal SRS or a demodulation reference signal.

With reference to the second possible implementation of the sixth aspect, in a fourth possible implementation of the sixth aspect, the sequence is a beacon or a synchronization sequence.

With reference to the second possible implementation of the sixth aspect, in a fifth possible implementation of the sixth aspect, the code is a Code Division Multiple Access CDMA code or a preamble.

With reference to any one of the sixth aspect, or the first possible implementation of the sixth aspect to the fifth possible implementation of the sixth aspect, in a sixth possible implementation of the sixth aspect, the transmitter is configured to send the specific information to the served UE on a common resource, where the neighboring cells are corresponding to different specific information; or
  send the specific information to the served UE on different time-domain resources.

With reference to the sixth possible implementation of the sixth aspect, in a seventh possible implementation of the sixth aspect, the transmitter is further configured to send related information of the common resource to the served UE.

With reference to the seventh possible implementation of the sixth aspect, in an eighth possible implementation of the sixth aspect, the transmitter is configured to send the related information to the served UE by using broadcast signaling or dedicated Radio Resource Control RRC signaling.

With reference to the sixth possible implementation of the sixth aspect, in a ninth possible implementation of the sixth aspect, there is a matching table including the specific information and the corresponding neighboring cells, and the transmitter is configured to send the matching table to the served UE by using broadcast signaling or dedicated Radio Resource Control RRC signaling.

With reference to any one of the sixth aspect, or the first possible implementation of the sixth aspect to the ninth possible implementation of the sixth aspect, in a tenth possible implementation of the sixth aspect, the processor is further configured to: obtain a reference signal received power RSRP or a reference signal received quality RSRQ of each neighboring cell; and determine whether the RSRP or the RSRQ satisfies a threshold.

With reference to the tenth possible implementation of the sixth aspect, in an eleventh possible implementation of the sixth aspect, the processor is further configured to: estimate a path loss according to the RSRP or the RSRQ, to obtain an estimated path loss value; and determine a transmit power according to the estimated path loss value; and
  the transmitter is configured to send the specific information to the served UE at the transmit power.

With reference to any one of the sixth aspect, or the first possible implementation of the sixth aspect to the fifth possible implementation of the sixth aspect, in a twelfth possible implementation of the sixth aspect, the transmitter is configured to send the specific information to the UE by using a transmit power control TPC command.

With reference to any one of the sixth aspect, or the first possible implementation of the sixth aspect to the twelfth possible implementation of the sixth aspect, in a thirteenth possible implementation of the sixth aspect, the serving base station is a macro base station, and the served UE is macro UE.

With reference to any one of the second possible implementation of the sixth aspect to the fifth possible implementation of the sixth aspect, in a fourteenth possible implementation of the sixth aspect, the transmitter is further configured to send the specific information to each neighboring cell, to notify each neighboring cell that the served UE is to obtain, based on the specific information, the restrictive measurement resource of each neighboring cell.

One or more technical solutions provided in the embodiments of the present invention have at least the following technical effects or advantages:

In the embodiments of the present invention, according to a distributed coordination mechanism, the base station serving the neighboring cell of the served UE sends, to the served UE, the restrictive measurement resource used by the base station. Therefore, the served UE can conveniently obtain the restrictive measurement resource used for each neighboring cell, and can perform neighboring-cell RRM measurement based on the restrictive measurement resource of the neighboring cell and/or perform RLM on the serving cell of the served UE based on the restrictive measurement resource of the neighboring cell, so as to obtain an accurate measurement result. In comparison with a prior-art centralized coordination mechanism in which a base station serving a neighboring cell backhauls a restrictive measurement resource to a serving base station of served UE and then the serving base station forwards the restrictive measurement resource to the served UE, the method in the embodiments of the present invention can greatly reduce backhaul transmission load.

DESCRIPTION OF EMBODIMENTS

Figure 1:
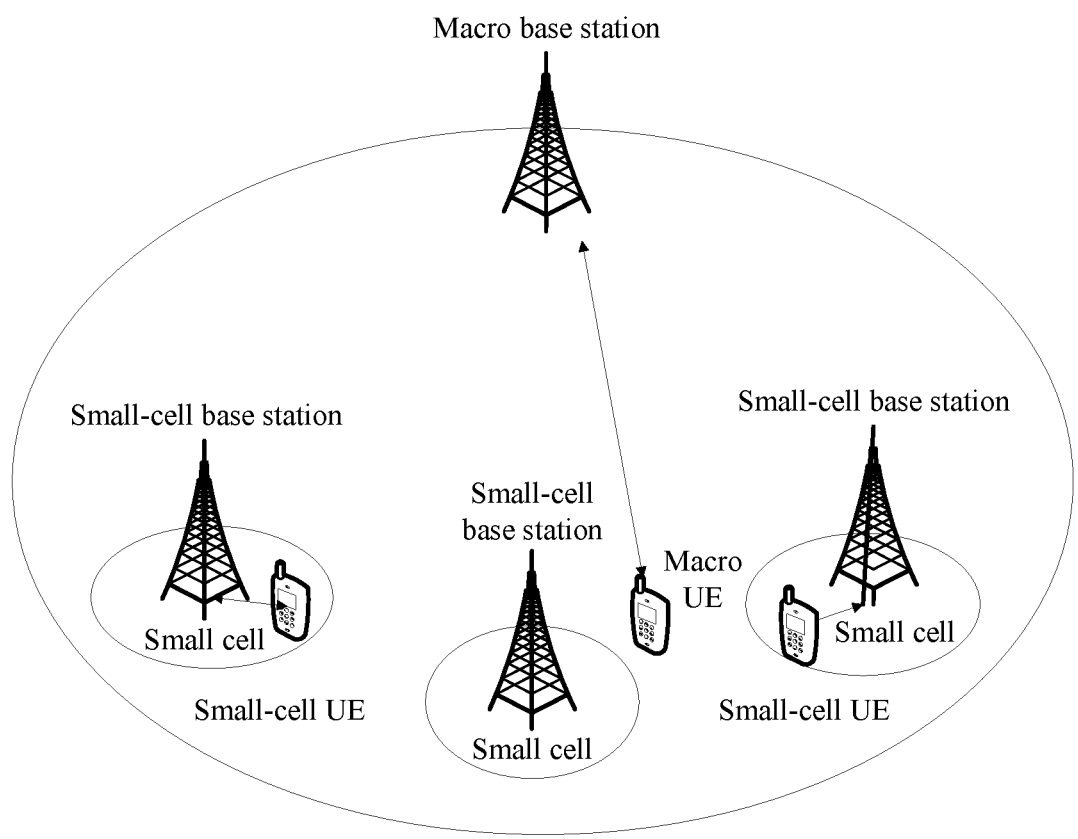
FIG. 1 is a schematic structural diagram of a heterogeneous network according to an embodiment of the present invention.

Embodiments of the present invention provide a measurement method and an apparatus, so as to resolve a prior-art technical problem that when small cells are densely distributed, serious mutual interference is caused and interference between the small cells affects a measurement effect and measurement accuracy of neighboring-cell RRM measurement and/or macro-cell RLM that are/is performed by macro UE.

To resolve the foregoing technical problem, main concepts of technical solutions in the embodiments of the present invention are proposed as follows:

Specifically, to avoid interference between small cells, an eICIC mode needs to be changed more frequently. However, due to a backhaul capacity and a delay limit, a macro base station cannot perform overall coordination. Therefore, the following two mechanisms may be used: One mechanism is a distributed coordination mechanism; the other mechanism is establishing a cluster head to maintain a small-cell cluster within a small scope.

Principles of the two mechanisms are: Different restrictive measurement resources are used for small cells that interfere with each other, so as to reduce mutual interference. Therefore, for small cells that macro UE approaches and that interfere with each other, the macro UE needs to use different restrictive measurement resources. Otherwise, a measurement result is seriously distorted.

However, the two mechanisms lead to the following consequence: The macro base station cannot learn a coordination result of the small cells, that is, the macro base station cannot learn restrictive measurement resources used for the small cells that interfere with each other. In this case, the macro base station cannot notify the macro UE of a specific restrictive measurement resource used for each neighboring cell, and the macro UE cannot learn the specific restrictive measurement resource used for each neighboring cell. As a result, RRM measurement cannot be accurately performed on each neighboring cell and/or RLM cannot be accurately performed on a serving cell.

The solutions proposed in the embodiments of the present invention are: According to a distributed coordination mechanism, a base station serving a neighboring cell of served UE sends, to the served UE, a restrictive measurement resource used by the base station. Therefore, the served UE can conveniently obtain the restrictive measurement resource used for each neighboring cell, and can perform neighboring-cell RRM measurement based on the restrictive measurement resource of the neighboring cell and/or perform RLM on a serving cell of the served UE based on the restrictive measurement resource of the neighboring cell, so as to obtain an accurate measurement result. In comparison with a prior-art centralized coordination mechanism in which a base station serving a neighboring cell backhauls a restrictive measurement resource to a serving base station of served UE and then the serving base station forwards the restrictive measurement resource to the served UE, the method in the embodiments of the present invention can greatly reduce a backhaul capacity.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Referring to FIG. 1, FIG. 1 is a simplified structural diagram of a heterogeneous network including a macro base station and a small-cell base station according to an embodiment of the present invention. An area covered by the macro base station is referred to as a macro cell. A plurality of small-cell base stations are deployed in the coverage area of the macro base station. An area covered by the small-cell base station is a small cell. The small cell is located within the macro cell. UE accessing the macro base station is referred to as macro UE. UE accessing the small-cell base station is referred to as small-cell UE. The small-cell base station is, for example, a micro base station, a femto base station, or a pico base station. Correspondingly, the small cell may be a micro cell, a femtocell, or a picocell.

The base station in this specification may be a device that communicates with a wireless terminal over an air interface in an access network by using one or more sectors. The base station may be configured to perform mutual conversion between a received over-the-air frame and an Internet Protocol (IP) packet and serve as a router between the wireless terminal and a rest portion of the access network. The rest portion of the access network may include an IP network. The base station may further coordinate attribute management of the air interface. For example, the base station may be a base transceiver station (English: Base Transceiver Station, BTS for short) in a Global System for Mobile Communications (English: Global System of Mobile communication, GSM for short) or in Code Division Multiple Access (English: Code Division Multiple Access, CDMA for short), a NodeB (English: NodeB, NB for short) in Wideband Code Division Multiple Access (English: Wideband Code Division Multiple Access, WCDMA for short), an evolved NodeB (English: Evolutional Node B, eNB or eNodeB for short), a relay node, or an access point in Long Term Evolution (English: Long Term Evolution, LTE for short), or a base station in a future 5G network. This is not limited in the present invention.

The UE mentioned in this specification may be a wireless terminal or a wired terminal. The wireless terminal may be a device that provides a user with voice and/or connectivity of other service data, a handheld device with a wireless connection function, or another processing device connected to a wireless modem. The wireless terminal may communicate with one or more core networks by using a radio access network (English: Radio Access Network, RAN for short). The wireless terminal may be a mobile terminal, such as a mobile phone (or referred to as a "cellular" phone) and a computer with a mobile terminal. For example, the mobile terminal may be a portable, pocket-sized, handheld, computer built-in, or in-vehicle mobile apparatus, and exchanges voice and/or data with the radio access network. For example, the wireless terminal may be a device such as a personal communication service (English: Personal Communication Service, PCS for short) phone, a cordless telephone set, a Session Initiation Protocol (English: Session Initiation Protocol, SIP for short) phone, a wireless local loop (English: Wireless Local Loop, WLL for short) station, or a personal digital assistant (English: Personal Digital Assistant, PDA for short). The wireless terminal may also be referred to as a system, a subscriber unit (Subscriber Unit), a subscriber station (Subscriber Station), a mobile station (Mobile Station), a mobile station (Mobile), a remote station (Remote Station), a remote terminal (Remote Terminal), an access terminal (Access Terminal), a user terminal (User Terminal), a user agent (User Agent), or a user device (User Device or User Equipment).

Figure 2:
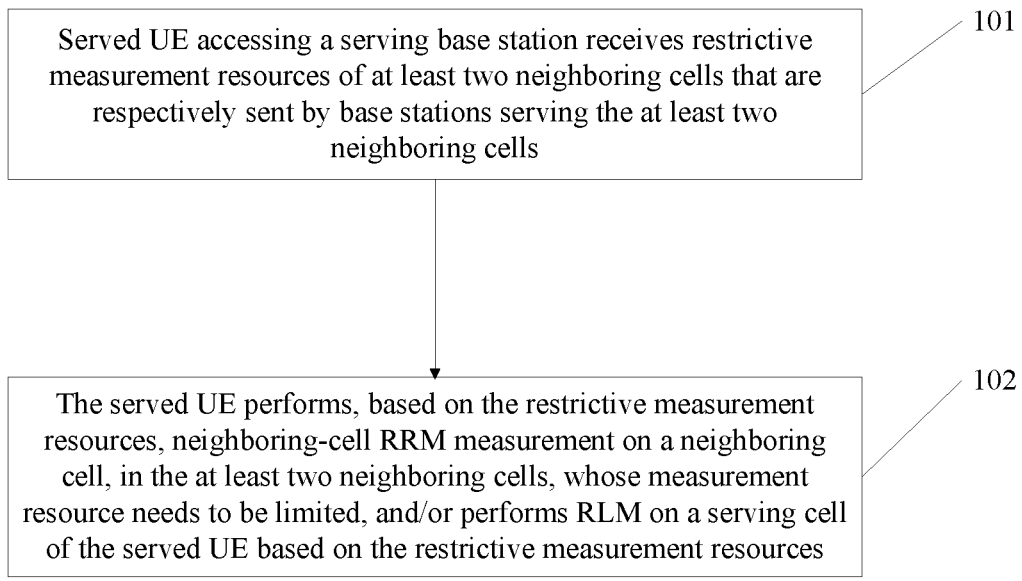
FIG. 2 is a flowchart of a measurement method according to an embodiment of the present invention.

Referring to FIG. 2, FIG. 2 is a flowchart of a neighboring-cell RRM measurement method according to an embodiment of the present invention. The method may be applied to the heterogeneous network shown in FIG. 1, or may be applied to another network whose structure is similar to that in FIG. 1. In actual application, names of a macro base station and a small-cell base station may change, but a structure relationship remains the same as a structure relationship between the macro base station and the small-cell base station. The method is also applied to such a network.

In this embodiment, the method shown in FIG. 2 is applied to served UE, for example, macro UE. As shown in FIG. 2, the method includes the following steps:

Step 101: The served UE accessing a serving base station receives restrictive measurement resources of at least two neighboring cells that are respectively sent by base stations serving the at least two neighboring cells, where the neighboring cells are, for example, the foregoing small cells.

Step 102: The served UE performs, based on the restrictive measurement resources, RRM measurement on a neighboring cell, in the at least two neighboring cells, whose measurement resource needs to be limited, and/or performs RLM on a serving cell of the served UE based on the restrictive measurement resources.

Figure 3:
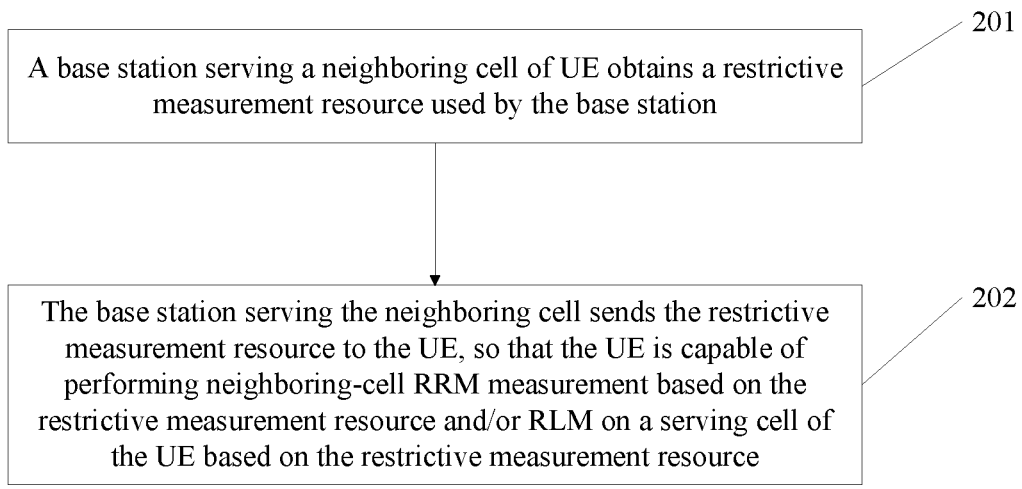
FIG. 3 is a flowchart of a restrictive measurement resource notification method according to an embodiment of the present invention.

It can be learnt that in this embodiment of this application, the restrictive measurement resources of the neighboring cells are respectively sent for the neighboring cells to the served UE. Referring to FIG. 3, FIG. 3 is a flowchart for notifying, on a neighboring-cell side, the served UE of the restrictive measurement resource by each neighboring cell. As shown in FIG. 3, the method includes the following steps:

Step 201: A base station serving a neighboring cell of UE obtains a restrictive measurement resource used by the base station.

Step 202: The base station serving the neighboring cell sends the restrictive measurement resource to the UE.

Optionally, the serving base station is, for example, a macro base station, and UE is macro UE. The neighboring cell may be a small cell.

Specifically, in step 201, the base station serving the neighboring cell configures the restrictive measurement resource by itself, and therefore, the base station serving the neighboring cell can obtain the restrictive measurement resource used by the base station.

Specifically, step 202 includes but is not limited to the following two implementations: In a first possible implementation, step 202 includes: The base station serving the neighboring cell broadcasts the restrictive measurement resource to the UE by using a broadcast channel.

In a second possible implementation, step 202 includes: The base station serving the neighboring cell sends the restrictive measurement resource to the UE based on a requirement indication sent by the UE, where the requirement indication is used to request the restrictive measurement resource.

Correspondingly, step 101 includes but is not limited to the following two implementations: Corresponding to the first possible implementation, a third possible implementation of step 101 is: Step 101: The served UE receives, by using broadcast channels of the at least two neighboring cells, the restrictive measurement resources of the at least two neighboring cells that are respectively sent by the base stations serving the at least two neighboring cells.

Corresponding to the second possible implementation, before step 101, the method further includes: sending, by the served UE, a requirement indication to each of the at least two neighboring cells, where the requirement indication is used to request the restrictive measurement resource. A fourth possible implementation of step 101 is: Step 101: The served UE receives the restrictive measurement resources that are sent for the at least two neighboring cells based on the requirement indication.

Specifically, in the first possible implementation, the base station serving the neighboring cell broadcasts a new system message (English: System Information Block, SIB for short) by using the broadcast channel, where the new SIB carries the restrictive measurement resource; or the base station serving the neighboring cell broadcasts a current SIB by using the broadcast channel, where a new information element (English: Information Element, IE for short) in the current SIB carries the restrictive measurement resource.

For example, a name of the new SIB is, for example, a SIB 17. The current SIB is, for example, a SIB of any type in a SIB 1 to a SIB 16.

Correspondingly, in the third possible implementation, the served UE receives, by using the broadcast channels of the at least two neighboring cells, new SIBs or new information elements in current SIBs that are respectively sent by the base stations serving the at least two neighboring cells; and obtains the restrictive measurement resources carried on the new SIBs or the new IEs in the current SIBs.

Specifically, the new SIB or the current SIB may carry the restrictive measurement resource by using an ABS. This can reduce interference between the neighboring cells.

Specifically, a transmission period of the new SIB is configured by the neighboring cell, and may be adjusted according to actual cases.

Specifically, a transmit power for broadcasting, by the base station serving the neighboring cell, the new SIB by using the broadcast channel is greater than a preset broadcast channel power. The preset broadcast channel power is common broadcast channel power. The transmit power for transmitting the new SIB is set to a value greater than the preset broadcast channel power, so that UE that does not access the neighboring cell, that is, UE that is not served by the neighboring cell, listens and obtains the new SIB.

Specifically, the method further includes: adjusting, by the base station serving the neighboring cell, the transmit power by using a handover success rate. The handover success rate is a handover success rate of an inter-cell handover of the served UE. For example, when the transmit power is set to a first value, the handover success rate is lower than a specified threshold. In this case, the transmit power may be increased until the handover success rate reaches or exceeds the threshold.

To ensure that a non-served UE correctly demodulates a new SIB to correctly obtain a restrictive measurement resource, the new SIB is processed in at least one of the following manners:

performing modulation by using a special modulation and coding scheme;

embedding a demodulation reference signal (English: Demodulation Reference Signal, DMRS for short) in the new SIB; or determining a ratio EPRE (English: Energy per Resource Element, EPRE for short) of the new SIB message and a reference signal, and indicating the ratio EPRE to the UE.

The special modulation and coding scheme, for example, a quadrature phase shift keying (English: Quadrature Phase Shift Keyin, QPSK for short) modulation scheme, is used. The ratio EPRE may be configured by using higher layer signaling, and may be carried in a current SIB, for example, the SIB 1.

Optionally, before step 202, the method further includes: sending, by the base station serving the neighboring cell, an indication message to the UE, where the indication message is used to indicate time-domain and/or frequency-domain resource location information of the new SIB message. Correspondingly, before step 101, the method further includes: sending, by the served UE, the indication message sent by the base stations serving the at least two neighboring cells, where the indication message is used to indicate the time-domain and/or frequency-domain resource location information of the new SIB message.

For example, the indication message may be a current SIB message, for example, the SIB 1. The time-domain resource location information may be a subframe for transmitting a new SIB, for example, the ABS. The frequency-domain resource location information may be a physical resource block (English: Physical Resource Block, PRB for short), used for transmitting a new SIB, in a subframe.

Therefore, the served UE may listen to the subframe indicated in the indication message, and parse the new SIB on the PRB indicated in the indication message. In this way, the restrictive measurement resource can be correctly obtained.

Specifically, in the second possible implementation, the requirement indication includes specific information corresponding to the neighboring cell, and before step 202, the method further includes: receiving, by the base station serving the neighboring cell, the specific information sent by the serving base station; or preconfiguring, by means of operation, administration, and management (English: Operation and Management, OAM for short), the specific information for the base station serving the neighboring cell. Therefore, when receiving the specific information sent by the served UE, the base station serving the neighboring cell can learn that the served UE is requesting the restrictive measurement resource.

Correspondingly, the requirement indication sent by the served UE to each of the at least two neighboring cells includes the specific information corresponding to each of the at least two neighboring cells.

Optionally, before the served UE sends the requirement indication to each of the at least two neighboring cells, the method further includes: receiving, by the served UE, the specific information sent by the serving base station.

Optionally, when the serving base station does not send the specific information to the neighboring cell or the specific information is not preconfigured for the neighboring cell, in addition to the specific information, the requirement indication includes purpose indication information. The purpose indication information is used to notify the neighboring cell that the specific information is used to obtain the restrictive measurement resource. Therefore, when receiving the requirement indication, the base station serving the neighboring cell can learn a purpose of the served UE according to the purpose indication information, and then sends the restrictive measurement resource to the served UE.

Further, optionally, step 102 includes: The base station serving the neighboring cell generates a notification message based on the requirement indication sent by the served UE, where the notification message carries the restrictive measurement resource, the notification message is coded by using a predefined radio network temporary identifier (English: Radio Network Temporary Identity, RNTI for short), and the RNTI is cross-correlated with the specific information; and sends the notification message to the UE by using a physical downlink shared channel (English: Physical downlink shared channel, PDSCH for short).

Correspondingly, when receiving the notification message, the UE decodes the notification message by using the predefined RNTI, to obtain the restrictive measurement resource.

Figure 4:
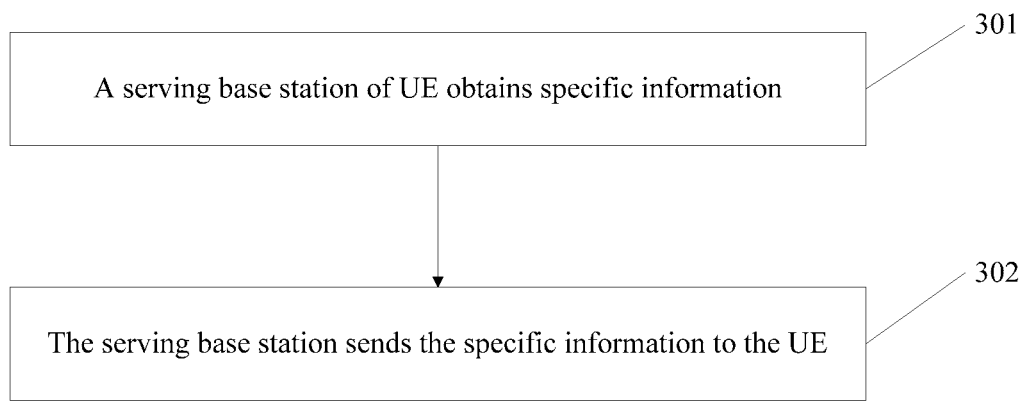
FIG. 4 is a flowchart of a restrictive measurement resource obtaining method according to an embodiment of the present invention.

Also referring to FIG. 4, FIG. 4 is a flowchart of a method for delivering specific information on a serving base station side. Referring to FIG. 4, the method includes the following steps:

Step 301: A serving base station of UE obtains specific information.

Step 302: The serving base station sends the specific information to the UE, so that the UE is capable of requesting, from each neighboring cell of the UE based on the specific information, a restrictive measurement resource of each neighboring cell, where the restrictive measurement resource is used by the UE to perform neighboring-cell RRM measurement and/or used by the UE to perform RLM on a serving cell of the UE.

Optionally, the specific information is a cell identity (ID) of each neighboring cell. For example, the cell ID is, for example, a specific physical cell ID (English: Physical Cell ID, PCI for short) of a specific neighboring cell. By using this method, specific configurations delivered from the serving base station can be reduced, so that configuration costs can be reduced.

Optionally, the specific information is a signal, a sequence, or a code. Specifically, the signal may be an existing sounding reference signal (English: Sounding Reference Signal, SRS for short) or a DMRS. The sequence may be a beacon (beaconing) or a synchronization sequence. The code may be a Code Division Multiple Access (English: Code Division Multiple Access, CDMA for short) code, for example, a randomly generated CDMA code, or may have a corresponding root index. The code may alternatively be a preamble (preamble code).

Optionally, step 302 includes: The serving base station sends the specific information to the UE on a common resource, where the neighboring cells are corresponding to different specific information; or the serving base station sends the specific information to the UE on different time-domain resources.

In terms of sending the specific information on the common resource, before the serving base station sends the specific information to the UE on the common resource, the method further includes: sending related information of the common resource to the UE. The related information is, for example, location information of the common resource, such as time-domain and/or frequency-domain location information. The serving base station may send the related information by using broadcast signaling or dedicated Radio Resource Control (English: Radio Resource Control, RRC for short) signaling.

Optionally, there is a matching table including the specific information and the corresponding neighboring cells. Therefore, the serving base station may send the matching table to the UE by using the broadcast signaling or the dedicated RRC signaling.

Optionally, the specific information corresponding to each neighboring cell may be predefined.

Optionally, the serving base station further notifies each neighboring cell of the specific information allocated to each neighboring cell, to notify each neighboring cell that the specific information is indication information that is used by the UE to obtain the restrictive measurement resource of each neighboring cell.

If the specific information is sent on different time-domain resources, because same specific information may be multiplexed, a quantity of specific information can be reduced, and a waste of resources can be avoided.

Optionally, before step 302, the method further includes: obtaining, by the serving base station, a reference signal received power (English: Reference Signal Receiving power, RSRP for short) or a reference signal received quality (English: Reference Signal Receiving Quality, RSRQ for short) of each neighboring cell. The serving base station performs step 302 only when the RSRP or the RSRQ satisfies a threshold, for example, when the RSRP or the RSRQ is greater than the threshold. The threshold indicates that the served UE approaches the neighboring cell, and will be seriously interfered with.

Specifically, the sending, by the serving base station, the specific information to the served UE includes: estimating, by the serving base station, a path loss according to the RSRP or the RSRQ, to obtain an estimated path loss value; determining, by the serving base station, a transmit power according to the estimated path loss value; and sending, by the serving base station, the specific information to the UE at the transmit power.

For example, the determining a transmit power according to the estimated path loss value may be: directly determining the estimated path loss value as the transmit power, or using a value obtained by adding an offset (offset) to the estimated path loss value, as the transmit power.

Specifically, the sending, by the serving base station, the specific information to the UE includes: sending, by the serving base station, the specific information to the UE by using a transmit power control (English: Transmission Power Control, TPC for short) command. The TPC command may be carried on a physical downlink control channel (English: Physical Downlink Control Channel, PDCCH for short) in format 1A, to indicate or adjust the transmit power value. format 1A is a fixed PDCCH format, and is familiar to a person skilled in the art. Details are not described herein again.

The foregoing describes a possible manner of generating and obtaining specific information. In actual application, the specific information may alternatively be generated and obtained in other manners provided that the UE is capable of requesting, from each neighboring cell based on the specific information, a restrictive measurement resource of each neighboring cell.

In addition, in actual application, a requirement indication sent by the served UE to each neighboring cell may be indication information that is predefined or negotiated between the served UE and each neighboring cell. This is not specifically limited in the present invention.

Specifically, in a possible implementation, before step 102, the method further includes: obtaining, by the served UE, the RSRP or the RSRQ of each of the at least two neighboring cells; and determining that a neighboring cell corresponding to an RSRP or an RSRQ that satisfies a first threshold is a neighboring cell whose measurement resource needs to be limited, where the first threshold indicates that the served UE approaches the neighboring cell, and will be seriously interfered with. The first threshold is a threshold specific to the neighboring cell.

For example, when the RSRP is greater than or equal to the first threshold, the neighboring cell corresponding to the RSRP is the neighboring cell whose measurement resource needs to be limited. When the RSRP is greater than or equal to the first threshold, it indicates that the served UE approaches the neighboring cell, and will be seriously interfered with. Therefore, neighboring-cell RRM measurement needs to be performed. The foregoing is the same with the RSRQ, and therefore details are described herein again. For example, in terms of RSRPs of three neighboring cells, if RSRPs of a neighboring cell 1 and a neighboring cell 2 are greater than the first threshold, and an RSRP of a neighboring cell 3 is less than the first threshold, it is determined that the neighboring cell 1 and the neighboring cell 2 are neighboring cells whose measurement resources need to be limited.

Correspondingly, the served UE performs RRM measurement on the neighboring cell 1 and the neighboring cell 2 on the restrictive measurement resources of the neighboring cell 1 and the neighboring cell 2.

Optionally, the served UE determines a neighboring cell corresponding to an RSRP or an RSRQ that does not satisfy the first threshold but satisfies a second threshold; and the served UE performs radio link monitoring (English: Radio Link Monitoring, RLM for short) on the serving cell on a restrictive measurement resource of the neighboring cell.

The second threshold is also specific to the neighboring cell.

The foregoing example continues to be used for description. The RSRP of the neighboring cell 3 is less than the first threshold, that is, does not satisfy the first threshold, but the RSRP of the neighboring cell 3 is greater than the second threshold, that is, satisfies the second threshold. In this case, RLM may be performed on the serving cell on a restrictive measurement resource of the neighboring cell 3.

In actual application, the first threshold and the second threshold may be delivered by the serving base station to the served UE.

Certainly, in actual application, RRM measurement may alternatively be performed on all neighboring cells, and/or RLM may be performed on the serving cell of the served UE by using restrictive measurement resources of all neighboring cells.

Optionally, the serving base station may adjust the first threshold according to a handover success rate. For example, when the first threshold is set to a first value, the handover success rate is lower than a preset threshold. In this case, the first threshold may be increased until the handover success rate reaches or exceeds the preset threshold.

Optionally, the serving base station may adjust the second threshold based on an RLM success rate. For example, when the second threshold is set to a second value, the RLM success rate is lower than a preset threshold. In this case, the second threshold may be increased until the RLM success rate reaches or exceeds the preset threshold.

A restrictive measurement resource may vary in different application scenarios. For example, when a cell-specific reference signal (English: Cell-specific Reference Signal, CRS for short) and/or an eICIC mechanism are/is used, the restrictive measurement resource is a subset of an ABS. In other words, when the CRS and/or the eICIC mechanism are/is used in a network applied to the method, the ABS is used. Therefore, to avoid interference, the restrictive measurement resource is a subset of the ABS. Correspondingly, step 102 includes: The served UE performs, in an ABS subframe corresponding to the restrictive measurement resource, neighboring-cell RRM measurement on the neighboring cell, in the at least two neighboring cells, whose measurement resource needs to be limited, and/or performs RLM on the serving cell of the served UE in the ABS subframe corresponding to the restrictive measurement resource.

For another example, when a cell on/off (cell on/off) mechanism and/or a coordinated multipoint transmission/reception (English: Coordinated Multiple Point, CoMP for short) mechanism are/is used, the restrictive measurement resource is a discovery reference signal (English: Discovery Reference Signal, DRS for short). Correspondingly, step 102 is: The served UE performs, based on the DRS, RRM measurement on the neighboring cell, in the at least two neighboring cells, whose measurement resource needs to be limited.

The DRS may be a channel state information-reference signal (English: Channel State Information-Reference Signal, CSI-RS for short) and/or a channel state information-interference measurement resource (English: Channel State Information-Interference Measurement Resource, CSI-IMR for short). Optionally, the CSI-RS may be a non zero power-channel state information-reference signal (English: Non Zero Power-Channel State Information-Reference Signal, NZP-CSI-RS for short).

Because an RS resource collision between neighboring cells in a cluster may be avoided by using many orthogonal configurations involved in a muting (muting) mechanism, best performance in identifying a cell or a transmission point is presented by using the CSI-RS.

In a case in which neighboring cells are densely distributed, performance of most precise measurement on an RSRP is presented by using the CSI-RS, especially for the second and third neighboring cells with higher RSRPs. When averaging is performed on some measurement samples, or when relatively high bandwidth, such as 25 resource blocks, is used, CSI-RS measurement precision can approximate to CRS measurement precision. A plurality of configurations may be allocated to a specific cell or transmission point, so that resource element (English: Resource Element, RE for short) density and corresponding link-layer RSRP measurement precision of the CSI-RS can match those of the CRS.

When CSI-RS measurement is used in a distributed-coordination-based ultra dense network (English: Ultra Dense Network, UDN for short), how a restrictive measurement resource of each neighboring cell is obtained by the served UE approaching the neighboring cell is a problem to be resolved. Therefore, the solution in this embodiment of the present invention may also be applied to a network in which a CSI-RS is used.

Optionally, after step 101, the method further includes: reporting, by the served UE, the restrictive measurement resource to the serving base station, so that the serving base station properly schedules the UE, for example, the serving base station schedules the served UE for data transmission on the restrictive measurement resource.

The served UE adds the restrictive measurement resource to a physical uplink shared channel (English: Physical Uplink Shared Channel, PUSCH for short), and reports the physical uplink shared channel to the serving base station.

Further, optionally, the served UE feeds back the restrictive measurement resource according to a preset mode, so that the serving base station receives and correctly obtains the restrictive measurement resource. For example, the served UE sends, to the serving base station, a 40-bit bitmap on which 0 and 1 are used as marks. A mark 0 indicates that a corresponding subframe is not set as an ABS. A mark 1 indicates that a corresponding subframe is set as an ABS. After receiving the bitmap, the serving base station can learn that the served UE needs to be scheduled in the subframe corresponding to the mark 1.

It can be learnt from the foregoing description that in this embodiment of the present invention, according to a distributed coordination mechanism, the base station serving the neighboring cell of the served UE sends, to the served UE, the restrictive measurement resource used by the base station. Therefore, the served UE can conveniently obtain the restrictive measurement resource used for each neighboring cell, and can perform neighboring-cell RRM measurement based on the restrictive measurement resource of the neighboring cell and/or perform RLM on the serving cell of the served UE based on the restrictive measurement resource of the neighboring cell, so as to obtain an accurate measurement result. In comparison with a prior-art centralized coordination mechanism in which a base station serving a neighboring cell backhauls a restrictive measurement resource to a serving base station of served UE and then the serving base station forwards the restrictive measurement resource to the served UE, the method in this embodiment of the present invention can greatly reduce backhaul transmission load.

Figure 5:
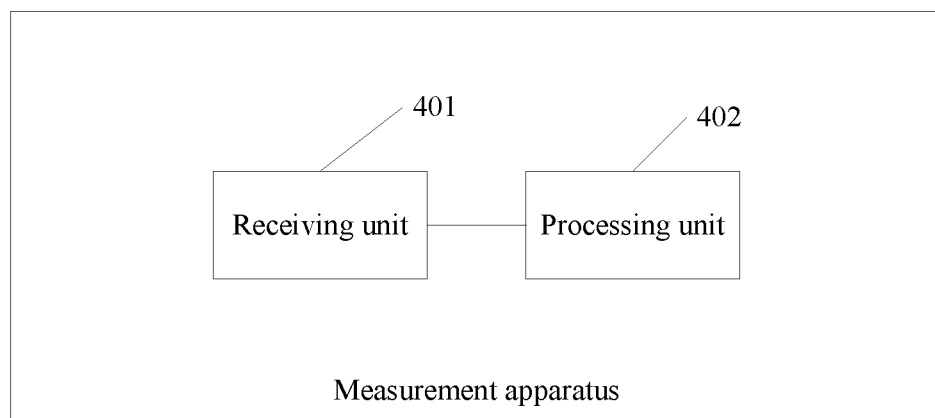
FIG. 5 is a functional block diagram of a measurement apparatus according to an embodiment of the present invention.

Based on a same inventive concept, an embodiment of the present invention further provides a measurement apparatus, configured to implement the method shown in FIG. 2. As shown in FIG. 5, the apparatus includes: a receiving unit 401, configured to receive restrictive measurement resources of at least two neighboring cells that are respectively sent by base stations serving the at least two neighboring cells; and a processing unit 402, configured to: perform, based on the restrictive measurement resources, RRM measurement on a neighboring cell, in the at least two neighboring cells, whose measurement resource needs to be limited, and/or perform RLM on a serving cell of UE based on the restrictive measurement resources, where the at least two neighboring cells are neighboring cells of the UE.

Optionally, the receiving unit 401 is configured to receive, by using broadcast channels of the at least two neighboring cells, the restrictive measurement resources of the at least two neighboring cells that are respectively sent by the base stations serving the at least two neighboring cells.

Optionally, the receiving unit 401 is configured to: receive, by using the broadcast channels of the at least two neighboring cells, new system messages SIBs or existing system messages SIBs that are respectively sent by the base stations serving the at least two neighboring cells; and obtain the restrictive measurement resources carried on the new system messages SIBs or on a new information element in the existing system messages SIBs.

Optionally, the receiving unit 401 is configured to receive an indication message sent by the base stations serving the at least two neighboring cells, where the indication message is used to indicate time-domain and/or frequency-domain resource location information of the new SIB messages.

Optionally, the measurement apparatus further includes: a sending unit, configured to send a requirement indication to each of the at least two neighboring cells, where the requirement indication is used to request the restrictive measurement resource.

Optionally, the requirement indication includes specific information corresponding to each of the at least two neighboring cells.

Optionally, the specific information is a signal, a sequence, or a code.

Optionally, the signal is a sounding reference signal SRS or a demodulation reference signal DMRS.

Optionally, the sequence is a beacon or a synchronization sequence.

Optionally, the code is a Code Division Multiple Access CDMA code or a preamble.

Optionally, the receiving unit 401 is further configured to receive the specific information sent by the serving base station.

Optionally, the receiving unit 401 is configured to receive the specific information by using broadcast signaling or dedicated Radio Resource Control RRC signaling.

Optionally, the requirement indication further includes purpose indication information, which is used to notify the base station serving the neighboring cell that the specific information is used to obtain the restrictive measurement resource.

Optionally, the receiving unit 401 is configured to: receive, on a physical downlink shared channel PDSCH, notification messages that are respectively sent by the base stations serving the at least two neighboring cells, where the notification messages carry the restrictive measurement resources; and decode the notification messages by using a predefined radio network temporary identifier RNTI, to obtain the restrictive measurement resources, where the RNTI is cross-correlated with the specific information.

Optionally, the processing unit 402 is configured to: obtain a reference signal received power RSRP or a reference signal received quality RSRQ of each of the at least two neighboring cells; and determine that a neighboring cell corresponding to an RSRP or an RSRQ that satisfies a first threshold is the neighboring cell whose measurement resource needs to be limited, where the first threshold indicates that the UE approaches the neighboring cell.

Optionally, when a cell-specific reference signal CRS and/or an enhanced inter-cell interference coordination eICIC mechanism are/is used, the restrictive measurement resources are subsets of an almost blank subframe ABS; or when a cell on/off mechanism and/or a coordinated multipoint transmission/reception CoMP mechanism are/is used, the restrictive measurement resources are discovery reference signals DRSs, where the DRSs are channel state information-reference signals CSI-RSs and/or channel state information-interference measurement resources CSI-IMRs.

Optionally, the CSI-RS is an NZP-CSI-RS.

Optionally, the processing unit 402 is further configured to: when the restrictive measurement resources are subsets of the almost blank subframe ABS, determine a neighboring cell corresponding to an RSRP or an RSRQ that does not satisfy the first threshold but satisfies a second threshold; and perform radio link monitoring RLM on the serving cell on the restrictive measurement resource of the neighboring cell.

Optionally, the measurement apparatus further includes: a sending unit, configured to report the restrictive measurement resources to the serving base station, so that the serving base station schedules the UE for data transmission on the restrictive measurement resources.

Optionally, the sending unit is configured to report the restrictive measurement resources to the serving base station by using a physical uplink shared channel PUSCH.

Optionally, the sending unit is configured to report the restrictive measurement resources to the serving base station according to a preset mode, so that the serving base station is capable of correctly obtaining the restrictive measurement resources.

Optionally, the UE is macro UE accessing a macro base station.

Various variation manners and specific instances of the measurement method in the foregoing embodiment shown in FIG. 2 are also applicable to the measurement apparatus in this embodiment. By means of the foregoing detailed description of the measurement method, a person skilled in the art can clearly know an implementation method of the measurement apparatus in this embodiment. For brevity of this specification, details are not described herein.

Figure 6:
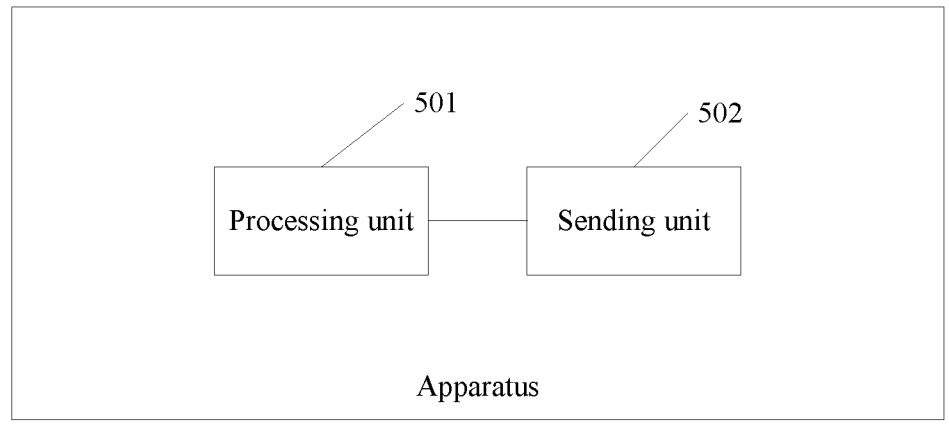
FIG. 6 is a functional block diagram of another apparatus according to an embodiment of the present invention.

Based on a same inventive concept, an embodiment of the present invention further provides an apparatus. As shown in FIG. 6, the apparatus includes a processing unit 501 and a sending unit 502.

The apparatus may be a restrictive measurement resource notification apparatus, configured to implement the restrictive measurement resource notification method shown in FIG. 3. The apparatus may alternatively be a restrictive measurement resource obtaining apparatus, configured to implement the restrictive measurement resource obtaining method shown in FIG. 4. In actual application, the apparatus can be configured differently according to different implementation methods.

Specifically, when the apparatus is a restrictive measurement resource notification apparatus, the processing unit 501 is configured to obtain a restrictive measurement resource used for a neighboring cell; and the sending unit 502 is configured to send the restrictive measurement resource to user equipment UE, so that the UE is capable of performing neighboring-cell radio resource management RRM measurement based on the restrictive measurement resource and/or performing RLM on a serving cell of the UE based on the restrictive measurement resource, where the neighboring cell is a neighboring cell of the UE.

Optionally, the sending unit 502 is configured to broadcast the restrictive measurement resource to the UE by using a broadcast channel.

Optionally, the sending unit 502 is configured to broadcast a new system message SIB by using the broadcast channel, where the new SIB carries the restrictive measurement resource; or broadcast an existing system message SIB by using the broadcast channel, where a new information element in the current SIB carries the restrictive measurement resource.

Optionally, the new SIB or the current SIB carries the restrictive measurement resource by using an almost blank subframe ABS.

Optionally, a transmit power for broadcasting, by the sending unit 502, the new system message SIB by using the broadcast channel is greater than a preset broadcast channel power.

Optionally, the processing unit 501 is further configured to adjust the transmit power by using a handover success rate.

Optionally, the new SIB is processed in at least one of the following manners:

performing modulation by using a special modulation and coding scheme;

embedding a demodulation reference signal DMRS in the new SIB; or determining a ratio EPRE between the new SIB message and a reference signal, and indicating the ratio EPRE to the UE.

Optionally, the sending unit 502 is further configured to send an indication message to the UE, where the indication message is used to indicate time-domain and/or frequency-domain resource location information of the new SIB message.

Optionally, the sending unit 502 is configured to send the restrictive measurement resource to the UE based on a requirement indication sent by the UE, where the requirement indication is used to request the restrictive measurement resource.

Optionally, the requirement indication includes specific information corresponding to the neighboring cell, and the specific information is preconfigured for the neighboring cell by means of operation, administration, and management OAM; or the apparatus further includes: a receiving unit, configured to receive the specific information sent by a serving base station of the UE.

Optionally, the requirement indication includes the specific information corresponding to the neighboring cell and purpose indication information, and the purpose indication information is used to notify the neighboring cell that the specific information is used to obtain the restrictive measurement resource.

Optionally, the processing unit 501 is further configured to generate a notification message based on the requirement indication sent by the UE, where the notification message carries the restrictive measurement resource, the notification message is coded by using a predefined radio network temporary identifier RNTI, and the RNTI is cross-correlated with the specific information; and the sending unit 502 is configured to send the notification message to the UE by using a physical downlink shared channel PDSCH.

Optionally, the specific information is a signal, a sequence, or a code.

Optionally, the signal is a sounding reference signal SRS or a demodulation reference signal DMRS.

Optionally, the sequence is a beacon or a synchronization sequence.

Optionally, the code is a Code Division Multiple Access CDMA code or a preamble.

Optionally, the serving base station is a macro base station, and the served UE is macro UE.

Specifically, when the apparatus is a restrictive measurement resource obtaining apparatus, the processing unit 501 is configured to obtain specific information; and the sending unit 502 is configured to send the specific information to user equipment UE, so that the UE is capable of requesting, from each neighboring cell of the UE based on the specific information, a restrictive measurement resource of each neighboring cell, where the restrictive measurement resource is used by the UE to perform neighboring-cell RRM measurement and/or used by the UE to perform RLM on a serving cell of the UE.

Optionally, the specific information is a cell identity ID of each neighboring cell.

Optionally, the specific information is a signal, a sequence, or a code.

Optionally, the signal is a sounding reference signal SRS or a demodulation reference signal.

Optionally, the sequence is a beacon or a synchronization sequence.

Optionally, the code is a Code Division Multiple Access CDMA code or a preamble.

Optionally, the sending unit 502 is configured to send the specific information to the served UE on a common resource, where the neighboring cells are corresponding to different specific information; or send the specific information to the served UE on different time-domain resources.

Optionally, the sending unit 502 is further configured to send related information of the common resource to the served UE.

Optionally, the sending unit 502 is configured to send the related information to the served UE by using broadcast signaling or dedicated Radio Resource Control RRC signaling.

Optionally, there is a matching table including the specific information and the corresponding neighboring cells. The sending unit 502 is configured to send the matching table to the served UE by using broadcast signaling or dedicated Radio Resource Control RRC signaling.

Optionally, the processing unit 501 is further configured to: obtain a reference signal received power RSRP or a reference signal received quality RSRQ of each neighboring cell; and determine whether the RSRP or the RSRQ satisfies a threshold.

Optionally, the processing unit 501 is further configured to: estimate a path loss according to the RSRP or the RSRQ, to obtain an estimated path loss value; and determine a transmit power according to the estimated path loss value; and the sending unit 502 is configured to send the specific information to the served UE at the transmit power.

Optionally, the sending unit 502 is configured to send the specific information to the UE by using a transmit power control TPC command.

Optionally, the serving base station is a macro base station, and the UE is macro UE.

Optionally, the sending unit 502 is further configured to send the specific information to each neighboring cell, to notify each neighboring cell that the UE is to obtain, based on the specific information, the restrictive measurement resource of each neighboring cell.

Various variation manners and specific instances of the methods in the foregoing embodiments shown in FIG. 3 and FIG. 4 are also applicable to the apparatus in this embodiment. By means of the foregoing detailed descriptions of the methods, a person skilled in the art can clearly know an implementation method of the apparatus in this embodiment. For brevity of this specification, details are not described herein.

Figure 7:
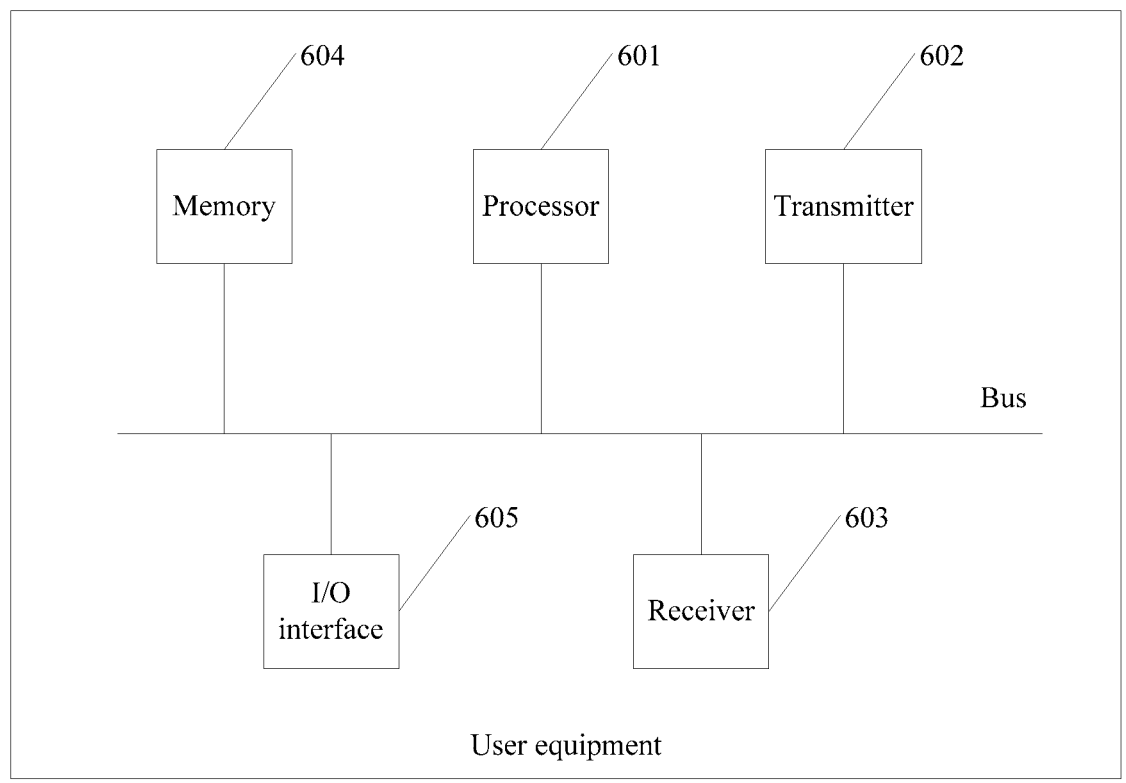
FIG. 7 is a structural block diagram of user equipment according to an embodiment of the present invention.

Based on a same inventive concept, an embodiment of the present invention further provides user equipment UE, configured to implement the method shown in FIG. 2. As shown in FIG. 7, the UE includes: a processor 601, a transmitter 602, a receiver 603, a memory 604, and an I/O interface 605. The processor 601 may be specifically a central processing unit or an application-specific integrated circuit (English: Application Specific Integrated Circuit, ASIC for short), may be one or more integrated circuits configured to control program execution, or may be a hardware circuit developed by using a field programmable gate array (English: Field Programmable Gate Array, FPGA for short). There may be one or more memories 604. The memory 604 may include a read-only memory (English: Read Only Memory, ROM for short), a random access memory (English: Random Access Memory, RAM for short), and a magnetic disk memory. The memory, the receiver 603, and the transmitter 602 are connected to the processor 601 by using a bus. The receiver 603 and the transmitter 602 are configured to perform network communication with an external device, and specifically, may communicate with an external device by using a network such as an Ethernet, a radio access network, or a wireless local area network. The receiver 603 and the transmitter 602 may be two physically independent elements, or a same physical element. The I/O interface 605 may be connected to a peripheral such as a mouse or a keyboard.

Specifically, the receiver 603 is configured to receive restrictive measurement resources of at least two neighboring cells that are respectively sent by base stations serving the at least two neighboring cells of the UE accessing a serving base station; and the processor 601 is configured to: perform, based on the restrictive measurement resources, RRM measurement on a neighboring cell, in the at least two neighboring cells, whose measurement resource needs to be limited, and/or perform radio link monitoring RLM on a serving cell of the UE based on the restrictive measurement resources.

Optionally, the receiver 603 is configured to receive, by using broadcast channels of the at least two neighboring cells, the restrictive measurement resources of the at least two neighboring cells that are respectively sent by the base stations serving the at least two neighboring cells.

Optionally, the receiver 603 is configured to: receive, by using the broadcast channels of the at least two neighboring cells, new system messages SIBs or existing system messages SIBs that are respectively sent by the base stations serving the at least two neighboring cells; and obtain the restrictive measurement resources carried on the new system messages SIBs or on a new information element in the existing system messages SIBs.

Optionally, the receiver 603 is configured to receive an indication message sent by the base stations serving the at least two neighboring cells, where the indication message is used to indicate time-domain and/or frequency-domain resource location information of the new SIB messages.

Optionally, the UE further includes: the transmitter 602, configured to send a requirement indication to each of the at least two neighboring cells, where the requirement indication is used to request the restrictive measurement resource.

Optionally, the requirement indication includes specific information corresponding to each of the at least two neighboring cells.

Optionally, the specific information is a signal, a sequence, or a code.

Optionally, the signal is a sounding reference signal SRS or a demodulation reference signal DMRS.

Optionally, the sequence is a beacon or a synchronization sequence.

Optionally, the code is a Code Division Multiple Access CDMA code or a preamble.

Optionally, the receiver 603 is further configured to receive the specific information sent by the serving base station.

Optionally, the receiver 603 is configured to receive the specific information by using broadcast signaling or dedicated Radio Resource Control RRC signaling.

Optionally, the requirement indication further includes purpose indication information, which is used to notify the base station serving the neighboring cell that the specific information is used to obtain the restrictive measurement resource.

Optionally, the receiver 603 is configured to: receive, on a physical downlink shared channel PDSCH, notification messages that are respectively sent by the base stations serving the at least two neighboring cells, where the notification messages carry the restrictive measurement resources; and decode the notification messages by using a predefined radio network temporary identifier RNTI, to obtain the restrictive measurement resources, where the RNTI is cross-correlated with the specific information.

Optionally, the processor 601 is configured to: obtain a reference signal received power RSRP or a reference signal received quality RSRQ of each of the at least two neighboring cells; and determine that a neighboring cell corresponding to an RSRP or an RSRQ that satisfies a first threshold is the neighboring cell whose measurement resource needs to be limited, where the first threshold indicates that the UE approaches the neighboring cell.

Optionally, when a cell-specific reference signal CRS and/or an enhanced inter-cell interference coordination eICIC mechanism are/is used, the restrictive measurement resources are subsets of an almost blank subframe ABS; or when a cell on/off mechanism and/or a coordinated multipoint transmission/reception CoMP mechanism are/is used, the restrictive measurement resources are discovery reference signals DRSs, where the DRSs are channel state information-reference signals CSI-RSs and/or channel state information-interference measurement resources CSI-IMRs.

Optionally, the processor 601 is further configured to: when the restrictive measurement resources are subsets of the almost blank subframe ABS, determine a neighboring cell corresponding to an RSRP or an RSRQ that does not satisfy the first threshold but satisfies a second threshold; and perform radio link monitoring RLM on the serving cell on the restrictive measurement resource of the neighboring cell.

Optionally, the UE further includes: the transmitter 602, configured to report the restrictive measurement resources to the serving base station, so that the serving base station schedules the UE for data transmission on the restrictive measurement resources.

Optionally, the transmitter 602 is configured to report the restrictive measurement resources to the serving base station by using a physical uplink shared channel PUSCH.

Optionally, the transmitter 602 is configured to report the restrictive measurement resources to the serving base station according to a preset mode, so that the serving base station is capable of correctly obtaining the restrictive measurement resources.

Optionally, the serving base station is a macro base station, and the user equipment is macro UE.

Various variation manners and specific instances of the measurement method in the foregoing embodiment shown in FIG. 2 are also applicable to the user equipment in this embodiment. By means of the foregoing detailed description of the measurement method, a person skilled in the art can clearly know an implementation method of the user equipment in this embodiment. For brevity of this specification, details are not described herein.

Figure 8:
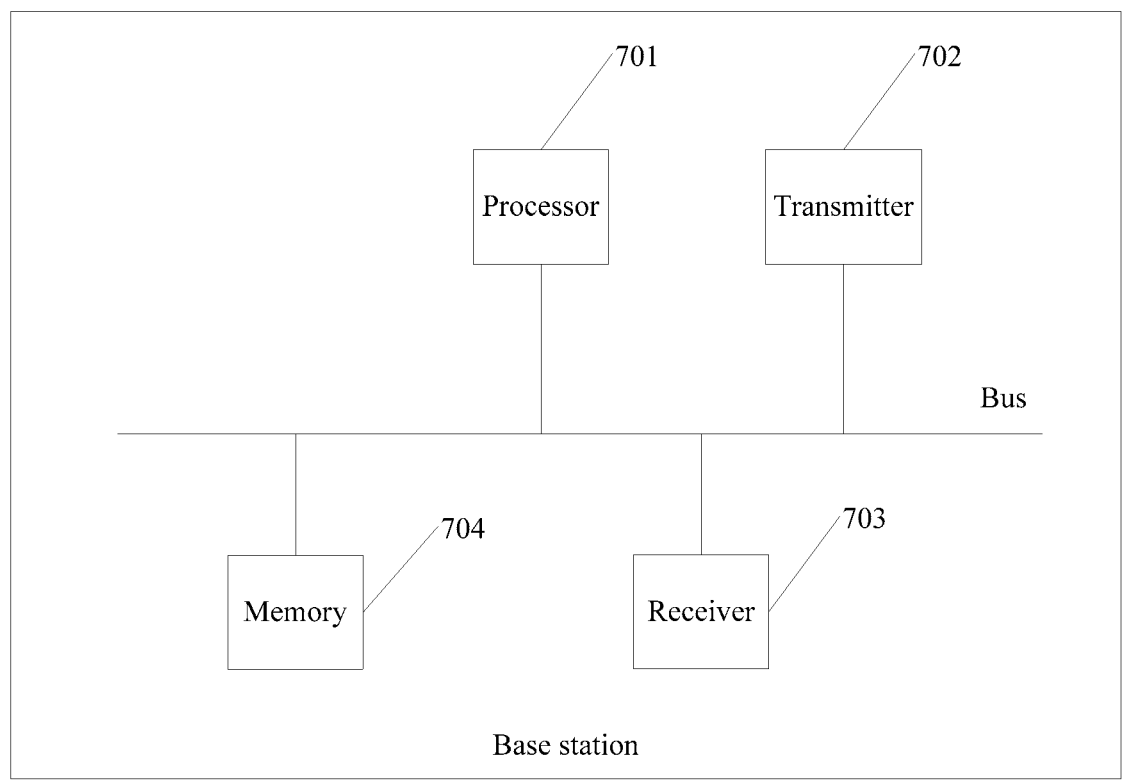
FIG. 8 is a structural block diagram of a base station according to an embodiment of the present invention.

Based on a same inventive concept, an embodiment of the present invention further provides a base station. As shown in FIG. 8, the base station includes a processor 701, a transmitter 702, a receiver 703, and a memory 704. The processor 701 may be specifically a central processing unit or an application-specific integrated circuit (English: Application Specific Integrated Circuit, ASIC for short), may be one or more integrated circuits configured to control program execution, or may be a hardware circuit developed by using a field programmable gate array (English: Field Programmable Gate Array, FPGA for short). There may be one or more memories 704. The memory 704 may include a read-only memory (English: Read Only Memory, ROM for short), a random access memory (English: Random Access Memory, RAM for short), and a magnetic disk memory. The memory, the receiver 703, and the transmitter 702 are connected to the processing circuit 701 by using a bus. The receiver 703 and the transmitter 702 are configured to perform network communication with an external device, and specifically, may communicate with an external device by using a network such as an Ethernet, a radio access network, or a wireless local area network. The receiver 703 and the transmitter 702 may be two physically independent elements, or a same physical element.

In actual application, the base station may be a base station serving a neighboring cell, configured to implement the method shown in FIG. 3. The base station may alternatively be a serving base station, configured to implement the method shown in FIG. 4. The base station may be specifically configured differently according to actual cases.

Specifically, when the base station is a base station serving a neighboring cell, the processor 701 is configured to obtain a restrictive measurement resource used by the base station; and the transmitter 702 is configured to send the restrictive measurement resource to user equipment UE, so that the UE is capable of performing neighboring-cell radio resource management RRM measurement based on the restrictive measurement resource and/or performing RLM on a serving cell of the UE based on the restrictive measurement resource, where the base station serving the neighboring cell is a base station serving a neighboring cell of the UE.

Optionally, the transmitter 702 is configured to broadcast the restrictive measurement resource to the UE by using a broadcast channel.

Optionally, the transmitter 702 is configured to broadcast a new system message SIB by using the broadcast channel, where the new SIB carries the restrictive measurement resource; or broadcast an existing system message SIB by using the broadcast channel, where a new information element in the current SIB carries the restrictive measurement resource.

Optionally, the new SIB or the current SIB carries the restrictive measurement resource by using an almost blank subframe ABS.

Optionally, a transmit power for broadcasting, by the transmitter 702, the new system message SIB by using the broadcast channel is greater than a preset broadcast channel power.

Optionally, the processor 701 is further configured to adjust the transmit power by using a handover success rate.

Optionally, the new SIB is processed in at least one of the following manners:

performing modulation by using a special modulation and coding scheme;

embedding a demodulation reference signal DMRS in the new SIB; or determining a ratio EPRE between the new SIB message and a reference signal, and indicating the ratio EPRE to the UE.

Optionally, the transmitter 702 is further configured to send an indication message to the UE, where the indication message is used to indicate time-domain and/or frequency-domain resource location information of the new SIB message.

Optionally, the transmitter 702 is configured to send the restrictive measurement resource to the UE based on a requirement indication sent by the UE, where the requirement indication is used to request the restrictive measurement resource.

Optionally, the requirement indication includes specific information corresponding to the neighboring cell, and the specific information is preconfigured, by means of operation, administration, and management OAM, for the base station serving the neighboring cell; or the base station serving the neighboring cell further includes: the receiver 703, configured to receive the specific information sent by a serving base station of the UE.

Optionally, the requirement indication includes the specific information corresponding to the neighboring cell and purpose indication information, and the purpose indication information is used to notify the base station serving the neighboring cell that the specific information is used to obtain the restrictive measurement resource.

Optionally, the processor 701 is further configured to generate a notification message based on the requirement indication sent by the UE, where the notification message carries the restrictive measurement resource, the notification message is coded by using a predefined radio network temporary identifier RNTI, and the RNTI is cross-correlated with the specific information; and the transmitter 702 is configured to send the notification message to the UE by using a physical downlink shared channel PDSCH.

Optionally, the specific information is a signal, a sequence, or a code.

Optionally, the signal is a sounding reference signal SRS or a demodulation reference signal DMRS.

Optionally, the sequence is a beacon or a synchronization sequence.

Optionally, the code is a Code Division Multiple Access CDMA code or a preamble.

Optionally, the UE is macro UE accessing a macro base station.

Specifically, when the base station is a serving base station, the processor 701 is configured to obtain specific information; and the transmitter 702 is configured to send the specific information to served UE accessing the serving base station, so that the UE is capable of requesting, from each neighboring cell of the UE based on the specific information, a restrictive measurement resource of each neighboring cell, where the restrictive measurement resource is used by the served UE to perform neighboring-cell RRM measurement and/or used by the served UE to perform RLM on a serving cell of the served UE.

Optionally, the specific information is a cell identity ID of each neighboring cell.

Optionally, the specific information is a signal, a sequence, or a code.

Optionally, the signal is a sounding reference signal SRS or a demodulation reference signal.

Optionally, the sequence is a beacon or a synchronization sequence.

Optionally, the code is a Code Division Multiple Access CDMA code or a preamble.

Optionally, the transmitter 702 is configured to send the specific information to the served UE on a common resource, where the neighboring cells are corresponding to different specific information; or send the specific information to the served UE on different time-domain resources.

Optionally, the transmitter 702 is further configured to send related information of the common resource to the served UE.

Optionally, the transmitter 702 is configured to send the related information to the served UE by using broadcast signaling or dedicated Radio Resource Control RRC signaling.

Optionally, there is a matching table including the specific information and the corresponding neighboring cells. The transmitter 702 is configured to send the matching table to the served UE by using broadcast signaling or dedicated Radio Resource Control RRC signaling.

Optionally, the processor 701 is further configured to: obtain a reference signal received power RSRP or a reference signal received quality RSRQ of each neighboring cell; and determine whether the RSRP or the RSRQ satisfies a threshold.

Optionally, the processor 701 is further configured to: estimate a path loss according to the RSRP or the RSRQ, to obtain an estimated path loss value; and determine a transmit power according to the estimated path loss value; and the transmitter 702 is configured to send the specific information to the served UE at the transmit power.

Optionally, the transmitter 702 is configured to send the specific information to the UE by using a transmit power control TPC command.

Optionally, the transmitter 702 is further configured to send the specific information to each neighboring cell, to notify each neighboring cell that the served UE is to obtain, based on the specific information, the restrictive measurement resource of each neighboring cell.

Optionally, the serving base station is a macro base station, and the served UE is macro UE.

Various variation manners and specific instances of the methods in the foregoing embodiments shown in FIG. 3 and FIG. 4 are also applicable to the base station in this embodiment. By means of the foregoing detailed descriptions of the methods, a person skilled in the art can clearly know an implementation method of the base station in this embodiment. For brevity of this specification, details are not described herein.

One or more technical solutions provided in the embodiments of this application have at least the following technical effects or advantages:

In the embodiments of the present invention, according to a distributed coordination mechanism, the base station serving the neighboring cell of the served UE sends, to the served UE, the restrictive measurement resource used by the base station. Therefore, the served UE can conveniently obtain the restrictive measurement resource used for each neighboring cell, and can perform neighboring-cell RRM measurement based on the restrictive measurement resource of the neighboring cell and/or perform RLM on the serving cell of the served UE based on the restrictive measurement resource of the neighboring cell, so as to obtain an accurate measurement result. In comparison with a prior-art centralized coordination mechanism in which a base station serving a neighboring cell backhauls a restrictive measurement resource to a serving base station of served UE and then the serving base station forwards the restrictive measurement resource to the served UE, the method in the embodiments of the present invention can greatly reduce backhaul transmission load.

Obviously, a person skilled in the art can make various modifications and variations to the present invention without departing from the spirit and scope of the present invention. The present invention is intended to cover these modifications and variations provided that they fall within the scopes of the claims of the present invention and their equivalent technologies.

What is claimed is:

1. A measurement method, comprising:
   directly receiving, by served user equipment (UE) accessing a serving base station, restrictive measurement resources of at least two neighboring cells respectively sent by base stations serving the at least two neighboring cells; and
   performing, by the served UE based on the restrictive measurement resources, Radio Resource Management (RRM) measurement on a neighboring cell, in the at least two neighboring cells, whose measurement resource is to be limited, and/or performing radio link monitoring (RLM) on a serving cell of the served UE based on the restrictive measurement resources; and, wherein directly receiving, by the served UE accessing a serving base station, restrictive measurement resources of at least two neighboring cells that are respectively sent by base stations serving the at least two neighboring cells comprises:
   directly receiving, by the served UE by using broadcast channels of the at least two neighboring cells, the restrictive measurement resources of the at least two neighboring cells that are respectively sent by the base stations serving the at least two neighboring cells; and
   sending, by the served UE, a requirement indication to each of the at least two neighboring cells, wherein the requirement indication is used to request the restrictive measurement resource, wherein the restrictive measurement resources are channel state information-reference signals (CSI-RSs) and/or channel state information-interference measurement resources (CSI-IMRs).

2. The method according to claim 1, wherein before directly receiving, by served user equipment UE accessing the serving base station, the restrictive measurement resources of at least two neighboring cells respectively sent by base stations serving the at least two neighboring cells, the method further comprises:
   directly receiving, by the served UE, an indication message sent by the base stations serving the at least two neighboring cells, wherein the indication message is used to indicate time-domain and/or frequency-domain resource location information of new system information block (SIB) messages.

3. The method according to claim 1, wherein the requirement indication comprises specific information corresponding to each of the at least two neighboring cells.

4. The method according to claim 3, wherein the specific information is a signal, a sequence, or a code, wherein the code is a Code Division Multiple Access (CDMA) code or a preamble.

5. The method according to claim 3, wherein directly receiving, by the served user equipment UE accessing the serving base station, the restrictive measurement resources of the at least two neighboring cells respectively sent by base stations serving the at least two neighboring cells comprises:
   receiving, by the served UE on a physical downlink shared channel (PDSCH), notification messages that are respectively sent by the base stations serving the at least two neighboring cells, wherein the notification messages carry the restrictive measurement resources; and decoding, by the served UE, the notification messages by using a predefined radio network temporary identifier radio network temporary identifier (RNTI), to obtain the restrictive measurement resources, wherein the RNTI is cross-correlated with the specific information.

6. The method according to claim 5, wherein the restrictive measurement resources are subsets of an almost blank subframe (ABS).

7. User equipment UE, comprising:
a receiver, configured to directly receive restrictive measurement resources of at least two neighboring cells respectively sent by base stations serving the at least two neighboring cells of the UE accessing a serving base station;
a processor, configured to: perform, based on the restrictive measurement resources, Radio Resource Management (RRM) measurement on a neighboring cell, in the at least two neighboring cells, whose measurement resource is to be limited, and/or perform radio link monitoring (RLM) on a serving cell of the UE based on the restrictive measurement resources; and
a transmitter, configured to send a requirement indication to each of the at least two neighboring cells, wherein the requirement indication is used to request the restrictive measurement resource; and, wherein directly receiving, by the served UE accessing a serving base station, restrictive measurement resources of at least two neighboring cells that are respectively sent by base stations serving the at least two neighboring cells comprises:
directly receiving, by the served UE by using broadcast channels of the at least two neighboring cells, the restrictive measurement resources of the at least two neighboring cells that are respectively sent by the base stations serving the at least two neighboring cells, wherein the restrictive measurement resources are channel state information-reference signals (CSI-RSs) and/or channel state information-interference measurement resources (CSI-IMRs).

8. The UE according to claim 7, the receiver is configured to receive an indication message sent by the base stations serving the at least two neighboring cells, wherein the indication message is used to indicate time-domain and/or frequency-domain resource location information of new system information block (SIB) messages.

9. The UE according to claim 7, wherein the UE further comprises: a transmitter, configured to send a requirement indication to each of the at least two neighboring cells, wherein the requirement indication is used to request the restrictive measurement resource.

10. The UE according to claim 9, wherein the requirement indication comprises specific information corresponding to each of the at least two neighboring cells.

11. The UE according to claim 10, wherein the specific information is a signal, a sequence, or a code, wherein the code is a Code Division Multiple Access (CDMA) code or a preamble.

12. The UE according to claim 10, wherein the receiver is configured to: receive, on a physical downlink shared channel (PDSCH), notification messages that are respectively sent by the base stations serving the at least two neighboring cells, wherein the notification messages carry the restrictive measurement resources; and decode the notification messages by using a predefined radio network temporary identifier radio network temporary identifier radio network temporary identifier (RNTI), to obtain the restrictive measurement resources, wherein the RNTI is cross-correlated with the specific information.

13. The UE according to claim 12, wherein the restrictive measurement resources subsets of an almost blank subframe ABS.

14. A base station serving a neighboring cell, comprising:
a processor, configured to obtain a restrictive measurement resource used by the base station; and
a transmitter, configured to:
send the restrictive measurement resource to user equipment (UE), to enable the UE to perform neighboring-cell radio resource management (RRM) measurement based on the restrictive measurement resource and/or performing radio link monitoring (RLM) on a serving cell of the UE based on the restrictive measurement resource, wherein the base station serving the neighboring cell is a base station serving a neighboring cell of the UE;
broadcast the restrictive measurement resource to the UE by using a broadcast channel; and
send the restrictive measurement resource to the UE based on a requirement indication sent by the UE, wherein the requirement indication is used to request the restrictive measurement resource, wherein the restrictive measurement resources are channel state information-reference signals (CSI-RSs) and/or channel state information-interference measurement resources (CSI-IMRs).

15. The base station serving the neighboring cell according to claim 14, wherein the processor is further configured to generate a notification message based on the requirement indication sent by the UE, wherein the notification message carries the restrictive measurement resource, the notification message is coded by using a predefined radio network temporary identifier (RNTI), and the RNTI is cross-correlated with the specific information; and
the transmitter is configured to send the notification message to the UE by using a physical downlink shared channel (PDSCH).

* * * * *